US011770850B2

(12) United States Patent
Zhang et al.

(10) Patent No.: US 11,770,850 B2
(45) Date of Patent: *Sep. 26, 2023

(54) CHANNEL ACCESS PRIORITY FOR SIDELINK AND RELAY COMMUNICATIONS IN NR-U

(71) Applicant: QUALCOMM INCORPORATED, San Diego, CA (US)

(72) Inventors: Xiaoxia Zhang, San Diego, CA (US); Jing Sun, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/249,831

(22) Filed: Mar. 15, 2021

(65) Prior Publication Data

US 2021/0298070 A1 Sep. 23, 2021

Related U.S. Application Data

(60) Provisional application No. 62/992,674, filed on Mar. 20, 2020.

(51) Int. Cl.
*H04W 74/04* (2009.01)
*H04L 1/1812* (2023.01)
*H04W 92/18* (2009.01)

(52) U.S. Cl.
CPC ........... *H04W 74/04* (2013.01); *H04L 1/1812* (2013.01); *H04W 92/18* (2013.01)

(58) Field of Classification Search
CPC . H04W 74/04; H04W 92/18; H04W 74/0875; H04W 76/14; H04W 88/04;
(Continued)

(56) References Cited

U.S. PATENT DOCUMENTS 11,304,086 B2* 4/2022 Ozturk ............. H04W 28/0268
2017/0238342 A1* 8/2017 Yang ..................... H04W 16/14
370/329
(Continued)

FOREIGN PATENT DOCUMENTS

EP 3434061 A1 1/2019
WO 2019031808 A1 2/2019

OTHER PUBLICATIONS

Huawei, et al., "Further Considerations on Channel Access Priority Class", 3GPP Draft, 3GPP TSG-RAN WG2 Meeting 106, R2-1907540, Further Considerations on Channel Access Priority Class, 3rd Generation Partnership Project (3GPP), Mobile Competence Centre, 650, Route Des Lucioles, F-06921 Sophia-Antipolis, vol. RAN WG2, No. Reno, Nevada, US, Apr. 13, 2019-May 17, 2019, May 3, 2019 (May 3, 2019), XP051711822, 6 Pages, [cont'd in Box 2] [cont'd from Box 1] Retrieved from the Internet: URL: http://www.3gpp.org/ftp/tsg%5Fran/WG2%5FRL2/TSGR2%5F106/Docs/R2%2D1907540%2Ezip. [retrieved on May 3, 2019] paragraph [02.1] paragraph [02.2].

(Continued)

*Primary Examiner* — Abdullahi Ahmed
(74) *Attorney, Agent, or Firm* — Haynes and Boone, LLP

(57) ABSTRACT

Wireless communication devices, systems, and methods related to mechanisms to aid a user equipment (UE) in determining the channel access priority (CAPC) to use for a data radio bearer (DRB) on sidelink that includes multiple quality of service (QoS) flows for a transmission. The UE may receive an indication from a base station (BS) regarding what CAPC to use, or it may itself determine the CAPC based on a rule. The UE may map the plurality of QoS flows to the DRB and transmit the QoS flows using the DRB and the selected CAPC.

30 Claims, 12 Drawing Sheets

(58) Field of Classification Search
CPC .......... H04W 28/0268; H04W 28/0226; H04L 1/1812; H04L 2001/0097
See application file for complete search history.

(56) References Cited

U.S. PATENT DOCUMENTS

| | | | |
|---|---|---|---|
| 2020/0100285 A1* | 3/2020 | Roy ................... | H04W 72/1268 |
| 2020/0146054 A1* | 5/2020 | Jeon ..................... | H04L 5/0053 |
| 2020/0178290 A1* | 6/2020 | Lee .................... | H04W 74/0841 |
| 2020/0314895 A1* | 10/2020 | Bergström .......... | H04W 74/006 |
| 2021/0058819 A1* | 2/2021 | Ozturk ................. | H04W 76/15 |
| 2022/0272758 A1* | 8/2022 | Agiwal ............. | H04W 74/0833 |

OTHER PUBLICATIONS

International Search Report and Written Opinion—PCT/US2021/022621—ISA/EPO—dated Jul. 2, 2021.

* cited by examiner

| Channel Access Priority Class (*p*) | 5QI |
|---|---|
| 1 | 1, 3, 5, 65, 66, 67, 69, 70, 79, 80, 82, 83, 84, |
| 2 | 2, 7, 71 |
| 3 | 4, 6, 8, 9, 72, 73, 74, 76 |
| 4 | - |

FIG. 8

CHANNEL ACCESS PRIORITY FOR SIDELINK AND RELAY COMMUNICATIONS IN NR-U

CROSS REFERENCE TO RELATED APPLICATIONS

The present application claims priority to and the benefit of U.S. Provisional Patent Application No. 62/992,674, filed Mar. 20, 2020, which is hereby incorporated by reference in its entirety as if fully set forth below and for all applicable purposes.

TECHNICAL FIELD

This application relates to wireless communication systems, and more particularly to methods (and associated devices and systems) for determining the channel access priority (CAPC) to use for a sidelink radio bearer (SLRB) that includes multiple quality of service (QoS) flows.

INTRODUCTION

Wireless communications systems are widely deployed to provide various types of communication content such as voice, video, packet data, messaging, broadcast, and so on. These systems may be capable of supporting communication with multiple users by sharing available system resources. A wireless multiple-access communications system may include a number of base stations (BSs), each simultaneously supporting communications for multiple communication devices, which may be otherwise known as user equipment (UE). UEs may use a sidelink connection to communicate directly with other UEs, without the communication going first through a base station or an associated core network. UEs may also enlist a BS to aid in the scheduling of transmissions over sidelink, or other UEs to act as relays between a BS or network and other UEs.

The channel access priority for a QoS flow may be determined by the QoS flow's QoS identifier (also referred to as "5G QoS identifier" or 5QI, or PC5 5QI, or PC5 quality indicator ("PQI") for sidelink communications) based on a mapping. When a UE transmits data (e.g., on a configured grant), the UE multiplexes data from logical channels (LCH) depending on their priority into a medium access control (MAC) protocol data unit (PDU). The access priority (also referred to as "Channel Access Priority" or CAPC) of a MAC PDU may be the lowest access priority among all the logical channels in the MAC PDU when it is transmitted on a configured grant. This priority determines parameters to be used in performing Listen-Before-Talk (LBT) before transmitting on the configured grant.

However, problems arise when multiple QoS flows are permitted on a given data radio bearer (DRB), such as an SLRB on PC5, instead of being restricted to a one-to-one mapping. For example, with a many-to-one mapping possible (i.e., multiple QoS flows to one DRB), a UE may not know what CAPC to use for the SLRB on a sidelink connection with another UE, either for direct communication between the two UEs, or when a UE acts as a relay between the network and the other UE. Thus, there is a need to provide sidelink-connected UEs with the ability to determine the CAPC to use for an SLRB which includes multiple QoS flows with potentially different CAPCs.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes mapping, by a first user equipment (UE), a first plurality of quality of service flows (QoS flows) to a first data radio bearer (DRB) between the first UE and a second UE. The method further includes determining, by the first UE, a channel access priority class (CAPC) for the first DRB for transmitting a first data packet based on a rule applied to the first plurality of QoS flows mapped to the first DRB. The method further includes transmitting, by the first UE to the second UE, the first data packet with the determined CAPC.

In an additional aspect of the disclosure, a UE includes a processor configured to map a first plurality of QoS flows to a first DRB between the UE and a second UE. The processor is further configured to determine a CAPC for the first DRB for transmitting a first data packet based on a rule applied to the first plurality of QoS flows mapped to the first DRB. The UE also includes a transceiver configured to transmit to the second UE the first data packet with the determined CAPC.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

BRIEF DESCRIPTION OF THE DRAWINGS

FIG. 8 illustrates an exemplary table format for a mapping relationship according to some embodiments of the present disclosure.

DETAILED DESCRIPTION

Figure 1:
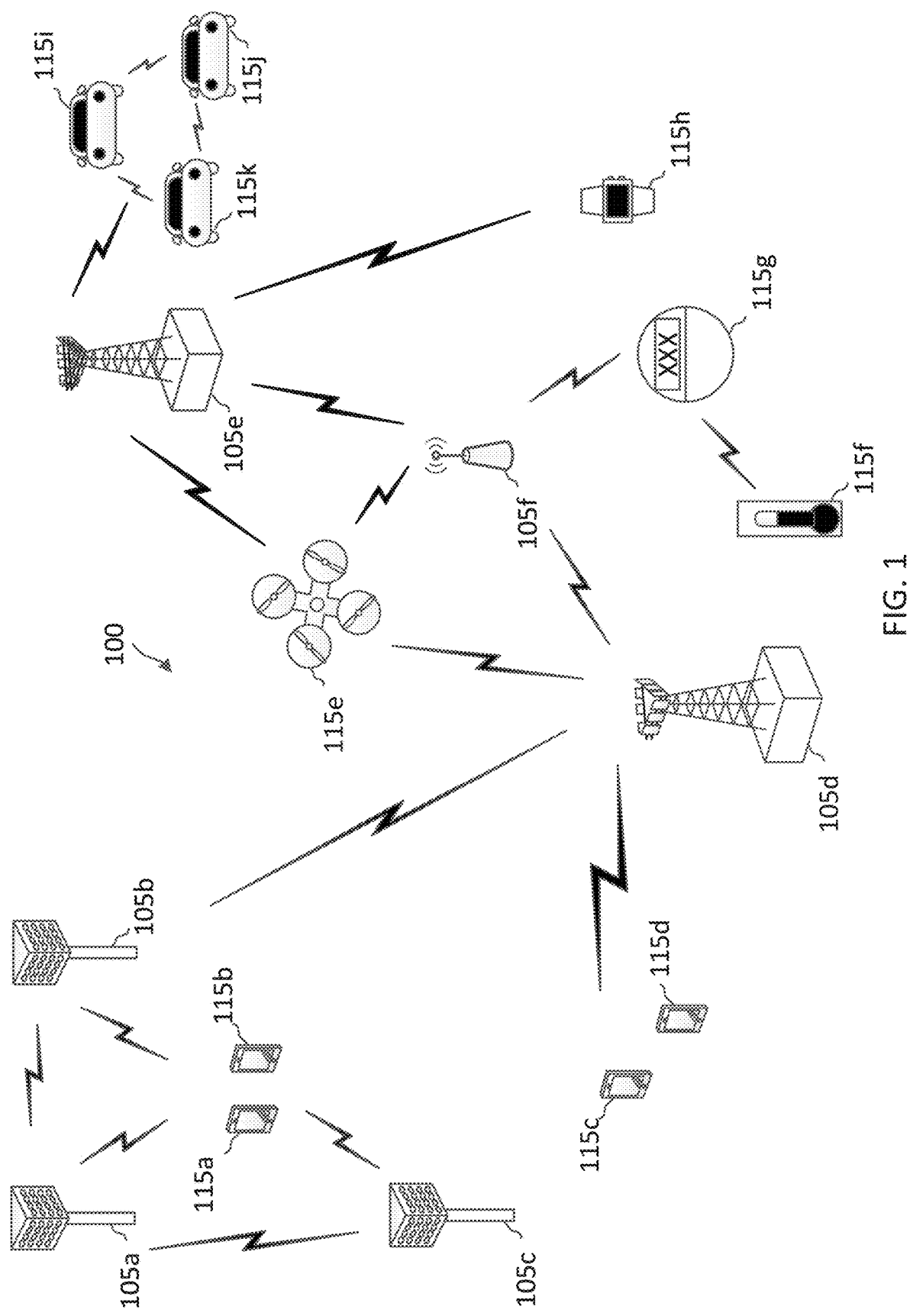
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms to determine the channel access priority (CAPC) to use for a data radio bearer (DRB, e.g., a common DRB for the multiple QoS flows combined into it). The DRB may be, for example, a sidelink radio bearer (SLRB), that includes multiple quality of service (QoS) flows for sidelink transmission.

In some embodiments, UEs may employ a rules-based approach to determine what CAPC to use in sidelink communication. The rules may be configured at a UE prior to a communication. For example, the rules may be configured at a UE in mode 2 sidelink, where each UE schedules its own transmissions with other UEs without relying on a BS for sidelink control. Alternately, the rules may be signaled dynamically to a UE by a BS. In yet further alternatives, the BS may indicate to a UE in mode 1 sidelink (where a BS schedules the transmissions between the UEs) a specific CAPC to use.

For example, a first UE may need to transmit data to a second UE that includes multiple different QoS flows carried on a SLRB (also referred to herein generally as a DRB or as a logical channel, LCH). In some embodiments, the UE may make its own determinations for sidelink communication independent of a BS, corresponding for example to a mode 2 scenario of sidelink communications. For example, the rule may be that different QoS flows carried on a DRB are mapped by the first UE based on each QoS flow in the DRB having the same access priority. As another example, the rule may be that the UE select the CAPC based on the lowest access priority of the QoS flows on the DRB. As another example, the rule may be that the UE select the CAPC based on the highest access priority of the QoS flows on the DRB. As another example, the rule may be that the UE select the CAPC based on the lowest or highest priority from among a subset of QoS flows on the DRB, where the subset is signaled by the BS. As another example, the rule may be that the UE select the CAPC based on the priority of the greatest number of QoS flows on the DRB that have the same priority.

As another example, the first UE may also need to transmit data to a third UE that includes multiple different QoS flows carried on a second—different—DRB, and the rule may be that the CAPC for the second DRB be different than the CAPC for the first DRB. The rule may also be that the UE select the CAPC for transmitting the data to the third UE based on the third UE being in a different zone than the first UE. As another example, the rule may be that the UE select the CAPC based on the type of transmission to be performed, e.g., broadcast, multicast, or unicast. The rule may be that among broadcast, multicast, and unicast, the UE selects the highest priority among the three for broadcast, the second highest priority among the three for multicast, and the lowest priority among the three for unicast. As another example, the rule may be that the UE select the CAPC based on whether the data is transmitted using hybrid automatic request repeat (HARD).

As another example, the UE may receive the CAPC to use for the transmission from a BS. This may correspond, for example, to a mode 1 scenario of sidelink communications. The BS may signal the CAPC to use when a QoS flow is added or removed from the QoS flows mapped to the DRB. The UE may also receive the CAPC from the BS, where the CAPC is based on the zone in which the UE is located. For example, if a third UE is located in a different zone than the second UE, the BS may signal a different CAPC for transmitting on the DRB to the third UE than the CAPC for transmitting on the DRB to the second UE. The BS may also signal a CAPC based on the HARQ mode used for transmission. For example, if the second UE uses a different HARQ mode than the third UE, the BS may signal to the first UE to use a different CAPC for transmission to the second UE than to the third UE. As another example, the BS may signal to the UE a different CAPC for transmitting data to the second UE than for transmitting data back to the BS (e.g., the BS may signal a different CAPC for transmitting to the BS on a Uu link than between UEs on a PC5 link). As another example, the UE may receive from the BS an access priority mapping rule for the DRB for use with the QoS flows at the first UE. The access priority mapping rule may include multiple access priority mapping rules, which may be updated dynamically. For example, the BS may configure multiple access priority rule mappings through an RRC message, and dynamically update the rules in a media access layer (MAC) control element (CE). The update may be based on the traffic patterns of the QoS flows and/or the traffic history of the flows.

In some embodiments, the UE may receive one or more packets belonging to a QoS flow that the UE has not received in the DRB. This may refer to reflective QoS. In such situations, the UE may update the access priority of the DRB according to a known rule (such as one of the above-noted rules). The UE may receive the CAPC for this new QoS flow, such as in the received packet, in the service data adaptation protocol (SDAP) header, the packet data convergence protocol (PDCP) header, MAC CE, RRC signaling, or PDCP control PDU. This may instead, or additionally, include the UE receiving the PQI for this sidelink QoS flow, such as in a received packet, or SDAP header, PDCP header, MAC CE, RRC signaling, or PDCP control PDU. The CAPC for the DRB may be updated according to one or more of the above rules with this new information for the new QoS flow. Further, when the BS adds or removes QoS flows (one or multiple) for the DRB (e.g., in response to UE request to do so), the UE may update the CAPC of the DRB based on the rule(s) in effect (such as from among those discussed above). Further, whenever the CAPC changes with respect to the DRB for sidelink transmission from the UE, the new CAPC may be applied to subsequent sidelink transmissions for the DRB, or alternatively may begin application when received. In general, when a new QoS flow is added, or when an existing QoS flow is removed from a DRB, the CAPC may be signaled to the UE (or, alternatively to the CAPC, the PQI for the QoS flow in which case the UE may perform a mapping between the received PQI and a CAPC to use). Alternately, the UE itself may determine the CAPC (e.g., by applying one or more of the rules herein) when a QoS flow is added or removed. In another example, when a PDU is received by the UE from a BS and retransmitted to the second UE, the UE may use a different CAPC for the Uu link than for the PC5 link.

In some embodiments, a first UE may serve as a relay between a BS and a second UE (the "remote UE"). For example, the relay UE may serve as a Layer 3 (L3) relay between the BS and the remote UE. In this case, the relay UE may perform sidelink CAPC control functions such as determining CAPCs for the UEs to use in sidelink communications between each other, including provisioning the remote UE with the CAPC to use with a second DRB from the remote UE to the relay UE. The relay UE may alternately serve as a Layer 2 (L2) relay between the BS and the remote UE. In this case, the BS may perform the control functions such as determining CAPCs to use, and signal to the relay UE a first CAPC for use with the first DRB (for transmitting data from the relay UE to the remote UE), as well as a second CAPC—which may be different than the first CAPC—for use with the second DRB (for transmitting data from the remote UE to the relay UE).

Aspects of the present application provide several benefits. For example, embodiments of the present disclosure enable UEs to determine what CAPC to apply to a DRB for sidelink transmissions, when the DRB includes multiple QoS flows with potentially different PQIs and/or CAPCs from each other (as well as potentially different CAPCs between PC5 and Uu links). Additional features and benefits of the present disclosure are set forth in the following description.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" may refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like, as well as in some embodiments with any type of other UE 115. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs, or sidelink transmissions between UEs (or via UEs serving as relays to BSs).

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V) communication. The network 100 may also further provide additional network efficiency through other device-to-device communication such as via PC5 links or other sidelinks, including according to embodiments of the present disclosure.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 may assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication may be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes may be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal may have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe may be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 may transmit synchronization signals (e.g., including a primary synchronization signal (PSS) and a secondary synchronization signal (SSS)) in the network 100 to facilitate synchronization. The BSs 105 may broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 may perform a random access procedure to establish a connection with the BS 105. In a four-step random access procedure, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response may be referred to as a message 1 (MSG 1), a message 2 (MSG 2), a message 3 (MSG 3), and a message 4 (MSG 4), respectively. In other examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (msgA). The combined random access response and connection response in the two-step random access procedure may be referred to as a message B (msgB).

After establishing a connection, the UE 115 and the BS 105 can enter an operational state, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. Further, the UE 115 may transmit a UL communication signal to the BS 105 according to a configured grant scheme.

A configured grant transmission is an unscheduled transmission, performed on the channel without a UL grant. A configured grant UL transmission may also be referred to as a grantless, grant-free, or autonomous transmission. In some examples, the UE 115 may transmit a UL resource via a configured grant. Additionally, configured-UL data may also be referred to as grantless UL data, grant-free UL data, unscheduled UL data, or autonomous UL (AUL) data. Additionally, a configured grant may also be referred to as a grant-free grant, unscheduled grant, or autonomous grant. The resources and other parameters used by the UE for a configured grant transmission may be provided by the BS in one or more of a RRC configuration or an activation DCI, without an explicit grant for each UE transmission. Moreover, the UE may utilize a configured grant transmission in one or more sidelink communications with one or more other UEs (either for D2D communication or the other UE operating as an L2 or L3 relay to a BS).

The CAPC informs the UE 115 with respect to parameters to be used in performing Listen-Before-Talk (LBT) before transmitting on the configured grant resource (e.g., a higher CAPC having a shorter LBT timing and a lower CAPC having a longer LBT timing due to lower priority). In an embodiment, the network 100 may provision for sidelink communications to allow a UE 115 to communicate with another UE 115 in device-to-device communication without transmitting data through a BS 105 and/or the core network, as described in FIG. 2 further below. Sidelink communication may occur in different modes, of which mode 1 and mode 2 are examples. In mode 1, a BS 105 schedules the resources to be used by a UE 115 connected to the network (i.e., in range of the BS 105) for sidelink communication with another UE 115. The BS may indicate which resources a UE 115 should use for transmission through a DCI format 5 message. In mode 2, a UE 115 may—without the aid of a BS 105—select the resources used for transmission to a different UE 115. Challenges may arise when multiple QoS flows are permitted on a given DRB, e.g., a SLRB, instead of a one-to-one mapping. With a many-to-one mapping possible, the UE 115 may not be able to determine what CAPC to use for a sidelink transmission to another UE 115, either for direct communication between the two UEs, or when a UE acts as a relay between the network and the other UE.

In some embodiments, the UE 115 may employ a rules-based approach to determine what CAPC to use in a sidelink transmission. The rules may be configured at the UE 115 prior to a communication independent from a BS 105 (e.g., in mode 2), or signaled by the BS 105 (e.g., in mode 1). The UE 115 may map multiple different QoS flows carried on a DRB and transmit data to a different UE 115 on the DRB.

For example, the rule may be that different QoS flows carried on a DRB are mapped by the first UE 115 based on each QoS flow in the DRB having the same access priority. As another example, the rule may be that the UE 115 select the CAPC based on the lowest access priority of the QoS flows on the DRB. As another example, the rule may be that the UE 115 select the CAPC based on the highest access priority of the QoS flows on the DRB. As another example, the rule may be that the UE 115 select the CAPC based on the lowest or highest priority from among a subset of QoS flows on the DRB, where the subset is signaled by the BS 105. As another example, the rule may be that the UE 115 select the CAPC based on the priority of the greatest number of QoS flows on the DRB that have the same priority.

As another example, the first UE 115 may also need to transmit data to a third UE 115 that includes multiple different QoS flows carried on a second—different—DRB, and the rule may be that the CAPC for the second DRB be different than the CAPC for the first DRB. As another example, the rule may be that the UE 115 select the CAPC for transmitting the data to the third UE 115 based on the third UE 115 being in a different zone than the first UE 115. As another example, the rule may be that the UE 115 select the CAPC based on the type of transmission to be performed, e.g., broadcast, multicast, or unicast. The rule may be that among broadcast, multicast, and unicast, the UE 115 selects the highest priority among the three for broadcast, the second highest priority among the three for multicast, and the lowest priority among the three for unicast. As another example, the rule may be that the UE 115 select the CAPC based on whether the data is transmitted using hybrid automatic request repeat (HARQ).

As another example, the UE 115 may receive the CAPC to use for the transmission from a BS 105 (e.g., according to a mode 1 scenario of sidelink communications). The BS 105 may signal the CAPC to use when a QoS flow is added or removed from the QoS flows mapped to the DRB. The UE 115 may also receive the CAPC from the BS 105, where the CAPC is based on the zone in which the UE 115 is located. For example, if a third UE 115 is located in a different zone than the second UE 115, the BS 105 may signal a different CAPC for transmitting on the DRB to the third UE 115 than the CAPC for transmitting on the DRB to the second UE 115. The BS 105 may also signal a CAPC based on the HARQ mode used for transmission. For example, if the second UE 115 uses a different HARQ mode than the third UE 115, the BS 105 may signal to the first UE 115 to use a different CAPC for transmission to the second UE 115 than to the third UE 115. As another example, the BS 105 may signal to the UE 115 a different CAPC for transmitting data to the second UE 115 than for transmitting data back to the BS 105 (e.g., the BS 105 may signal a different CAPC for transmitting to the BS 105 on a Uu link than between UEs 115 on a PC5 link). As another example, the UE 115 may receive from the BS 105 an access priority mapping rule for the DRB for use with the QoS flows at the first UE 115. The access priority mapping rule may include multiple access priority mapping rules, which may be updated dynamically. For example, the BS 105 may configure multiple access priority rule mappings through an RRC message, and dynamically update the rules in a media access layer (MAC)

control element (CE). The update may be based on the traffic patterns of the QoS flows and/or the traffic history of the flows.

In some embodiments, the UE 115 may receive one or more packets belonging to a QoS flow that the UE 115 has not received in the DRB. This may refer to reflective QoS. In such situations, the UE 115 may update the access priority of the DRB according to a known rule (such as one of the above-noted rules). The UE 115 may receive the CAPC for this new QoS flow, such as in the received packet, in the service data adaptation protocol (SDAP) header, the packet data convergence protocol (PDCP) header, MAC CE, RRC signaling, or PDCP control PDU. This may instead, or additionally, include the UE 115 receiving the PQI for this QoS flow, such as in a received packet, or SDAP header, PDCP header, MAC CE, RRC signaling, or PDCP control PDU. The CAPC for the DRB may be updated according to one or more of the above rules with this new information for the new QoS flow. Further, when the BS 105 adds or removes QoS flows (one or multiple) for the DRB (e.g., in response to the UE 115 requesting this be done), the UE 115 may update the CAPC of the DRB based on the rule(s) in effect (such as from among those discussed above). Further, whenever the CAPC changes with respect to the DRB for sidelink transmission from the UE 115, the new CAPC may be applied to subsequent sidelink transmissions for the DRB, or alternatively may begin application when received. In general, when a new QoS flow is added, or when an existing QoS flow is removed from a DRB, the CAPC may be signaled to the UE 115 (or, alternatively to the CAPC, the PQI for the QoS flow in which case the UE 115 may perform a mapping between the received PQI and a CAPC to use). Alternately, the UE 115 itself may determine the CAPC (e.g., by applying one or more of the rules herein) when a QoS flow is added or removed. In another example, when a PDU is received by the UE 115 from a BS 105 on a PC5 link and retransmitted to the second UE 115 on a Uu link, the UE 115 may use a different CAPC for the Uu link than for the PC5 link.

In some embodiments, a first UE 115 (the "relay UE") may serve as a relay between a BS 105 and a second UE 115 (the "remote UE"). For example, the relay UE 115 may serve as a Layer 3 (L3) relay between the BS 105 and the remote UE 115. In this case, the relay UE 115 may perform sidelink control functions like determine CAPCs for the UEs 115 to use in sidelink communications between each other, including provisioning the remote UE 115 with the CAPC to use with a second DRB from the remote UE 115 to the relay UE 115. The relay UE 115 may alternately serve as a Layer 2 (L2) relay between the BS 105 and the remote UE 115. In this case, the BS 105 may perform the control functions such as determining CAPCs to use, and signal to the relay UE 115 a first CAPC for use with the first DRB (for transmitting data from the relay UE 115 to the remote UE 115), as well as a second CAPC—which may be different than the first CAPC—for use with the second DRB (for transmitting data from the remote UE 115 to the relay UE 115).

The network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may acquire channel occupancy time (COT) in the shared medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP).

Figure 2:
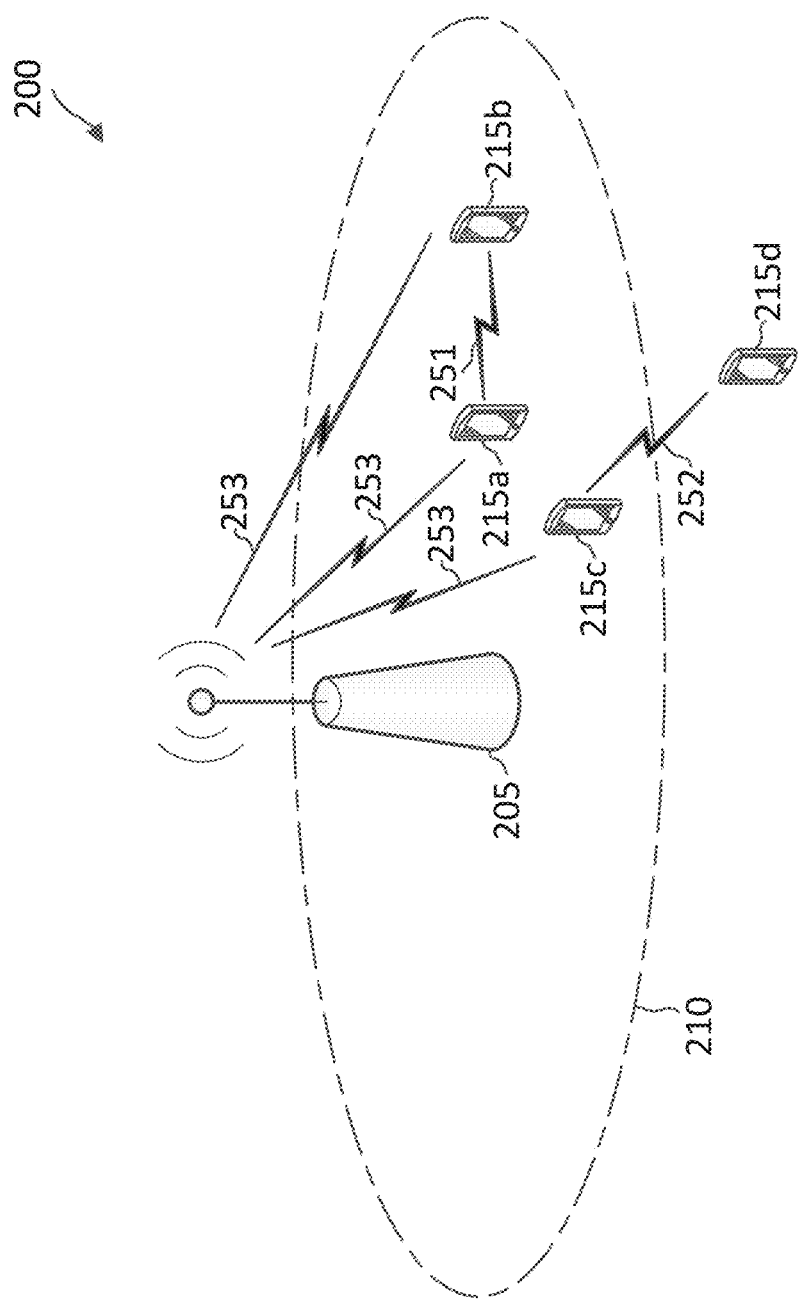
FIG. 2 illustrates a wireless communication network that provisions for device-to-device communications according to embodiments of the present disclosure.

FIG. 2 illustrates a wireless communication network 200 that provisions for device-to-device communications according to embodiments of the present disclosure. The network 200 may be similar to the network 100 (e.g., an example of some aspects thereof), and may be a LTE network or an NR network and operate over a shared radio frequency band (e.g., an unlicensed band). One BS 205 and four UEs 215 are illustrated for simplicity, though embodiments of the present disclosure may scale to any suitable number of UEs 215 and/or BSs 205. The BS 205 and the UEs 215 may be similar to the BSs 105 and the UEs 115, respectively. The BSs 205 and the UEs 215 may communicate over the same spectrum.

In the network 200, some UEs 215 may communicate with each other through a device-to-device connection, such as a sidelink connection. Sidelink communication may occur in different modes. In mode 1, a BS 205 schedules the resources to be used by a UE 215 connected to the network (i.e., in range of the BS 205) for sidelink communication with another UE 215. The BS may indicate which resources a UE 215 may use for transmission (e.g., conveyed via a DCI format 5 message as an example). In mode 2, a UE 215 may—without the aid of a BS 205—select the resources used for transmission to a different UE 215. Mode 2 may be used in scenarios where a UE 215 is outside the range of a BS 205, or in scenarios where the UE 215 is within range of a BS 205.

For example, as illustrated the UE 215a may communicate with the UE 215b over a sidelink 251, and the UE 215c may communicate with the UE 215d over another sidelink 252. In some instances, the sidelinks 251 and 252 are unicast bidirectional links, each between a pair of UEs 215. In some other instances, the sidelinks 251 and 252 can be multicast links supporting multicast sidelink services among the UEs 215 (not illustrated in FIG. 2). Some of the UEs 215 may also communicate with the BS 205 in a UL direction and/or a DL direction via communication links 253. For instance, the UEs 215a, 215b, and 215c are within the coverage area 210 of the BS 205 and may be in communication with the BS 205. The UE 215d is illustrated outside the coverage area 210 of the BS 205, and thus may not be in direct communication with the BS 205. In some instances, in order to facilitate the UE 215d communicating to the BS 205 (and, thereby, the core network to other devices) the UE 215c may operate as a relay between the BS 205 and the UE 215d. In some aspects, where some of the UEs 215 are associated with vehicles (e.g., similar to the UEs 115i-k), the communications over the sidelinks 251 and/or 252 may be C-V2X communications. C-V2X communications may refer to communications between vehicles and any other wireless communication devices in a cellular network. In other aspects, communications over the sidelinks 251 and/or 252 may be between other UE types such that the sidelinks 251 and/or 252 may be more generally PC5-based connections.

As noted already, the sidelinks 251 and 252 may allow multiple QoS flows on each and they may not necessarily have the same CAPCs for each QoS flow. Thus, challenges may arise since a one-to-one mapping of the CAPC for each QoS flow to the overall sidelink (SLRB). In some embodiments, a UE 215 may employ a rules-based approach to determine what CAPC to use for sidelink transmission when multiple QoS flows are permitted on a given DRB. The rules may be configured at the UE 215 prior to a communication or signaled by the BS 205, and may include a rule from those described in the discussion of FIG. 1 above and as further discussed with respect to the further embodiments and/or figures below.

Figure 3:
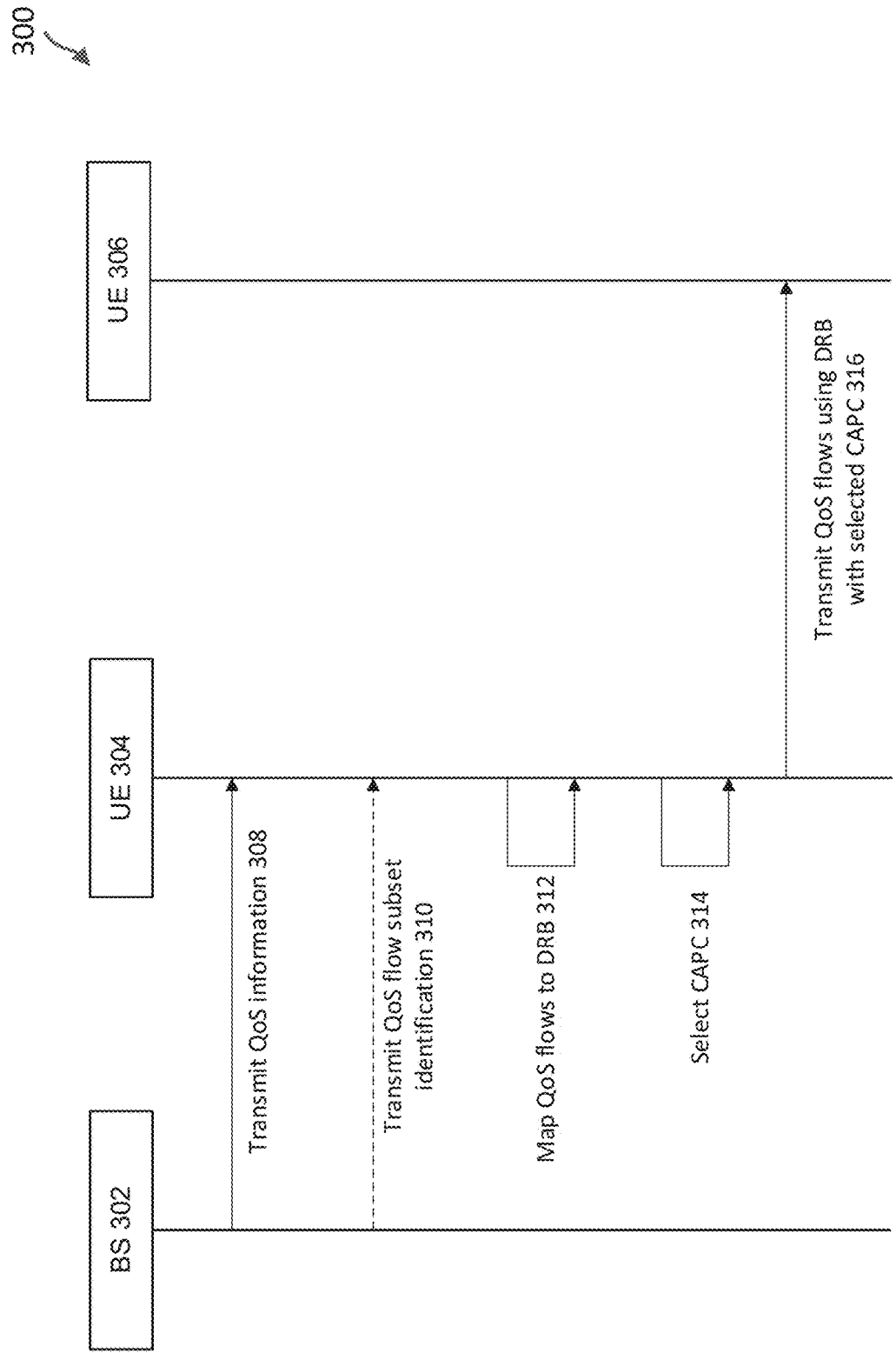
FIG. 3 illustrates a protocol diagram of a wireless communication method according to embodiments of the present disclosure.

FIG. 3 illustrates a protocol diagram of a wireless communication method 300, particularly a CAPC determination procedure for sidelink communications, between a BS 302 (which may be a BS 105/205), a first UE 304 (which may be a UE 115/215) and a second UE 306 (which may be a UE 115/215) according to some embodiments of the present disclosure.

At action 308, BS 302 may transmit QoS information to UE 304. In some embodiments, the QoS information indicates a set of rules for UE 304 to use in mapping the CAPCs of multiple QoS flows to a common CAPC for a DRB to the second UE 306 (e.g., where the UEs 304/306 are engaged in sidelink communication without BS control, such as mode 2). In other embodiments, the QoS information may be an explicit signaling of CAPC indication, such as where UE 304 is engaged in sidelink communication under express BS control of resource scheduling (e.g., mode 1 sidelink communication) with UE 306. BS 302 may transmit the CAPC indication, for example, as part of a DCI message, or in a packet header, MAC CE, or RRC signal, etc. In some alternative embodiments, even where the UE 304 is engaged in mode 1 sidelink communication (where the BS 302 controls resource scheduling), the BS 302 may still send as the QoS information a set of rules for the UE 304 to use in determining the CAPC to use for the resources scheduled by the BS 302, instead of explicitly signaling the CAPC for the UE 304 to use in the scheduled resources for the sidelink communication to UE 306.

At action 310, the BS 302 may transmit information identifying a subset of QoS flows relevant to the CAPC determination to UE 304. The BS 302 may transmit the information, for example, where the UE 304 is engaged in mode 2 sidelink communication (not under BS resource scheduling control). The subset information may include a list of the QoS flows that comprise the subset, or some smaller representation such as a short bit pattern that the UE 304 uses to look up, in a corresponding table, what subset the pattern identifies. The UE 304 may be configured to implement the subset signaled by the BS 302 to determine the CAPC for the DRB based on the lowest or highest priority from among the subset of QoS flows identified by the BS 302. Action 310 is illustrated as optional in the event that another rule is implemented by the UE 304, UE 306, and/or BS 302 (and which may have been signaled as part of action 308 discussed above).

At action 312, the UE 304 maps a plurality of QoS flows to a DRB (i.e., an SLRB) in order to communicate via the sidelink to the UE 306. The data in the QoS flows may originate from UE 304 (e.g., from an application on UE 304 or from information previously received from another UE or BS), or may come from BS 302 if UE 304 is acting as a relay (as described in detail in the discussion of FIG. 4). There may be one-to-many relationship between the QoS flows and a DRB. Thus, though there may be multiple DRBs, and any number of QoS flows in any of them, discussion herein will describe exemplary cases with respect to a given DRB with multiple QoS flows mapped to it for sake of discussion.

At action 314, the UE 304 selects a CAPC for a sidelink transmission based on the QoS information received from the BS 302 at action 308 (e.g., a rule or the CAPC indication, depending upon embodiment). The rules may include a rule from those identified in the discussion relating to FIG. 1 above. For example, the CAPC value may be selected based on the highest priority of the QoS flows in the DRB, or based on the lowest priority of the QoS flows in the DRB, or based on the priority of a subset of the QoS flows identified by BS 302 signaling and/or of the QoS flows that share the same PQI (identified, for example, by a mapping between QoS flow identifier (QFI) and PQI), or based on the zone in which UE 306 is located, or based on a transmission type (e.g., broadcast, multicast, or unicast), or based on whether the transmission employs HARQ, or based on the link type (e.g., Uu or PC5), or based on traffic patterns and/or traffic history to name some examples.

At action 316, UE 304 transmits the QoS flows on the DRB with the CAPC selected at action 314. For example, where three QoS flows (as just an exemplary value) are all mapped to the DRB, those three QoS flows are transmitted as part of that DRB to the UE 306 with the DRB using the single CAPC—even if the different QoS flows individually had different CAPCs.

Figure 4:
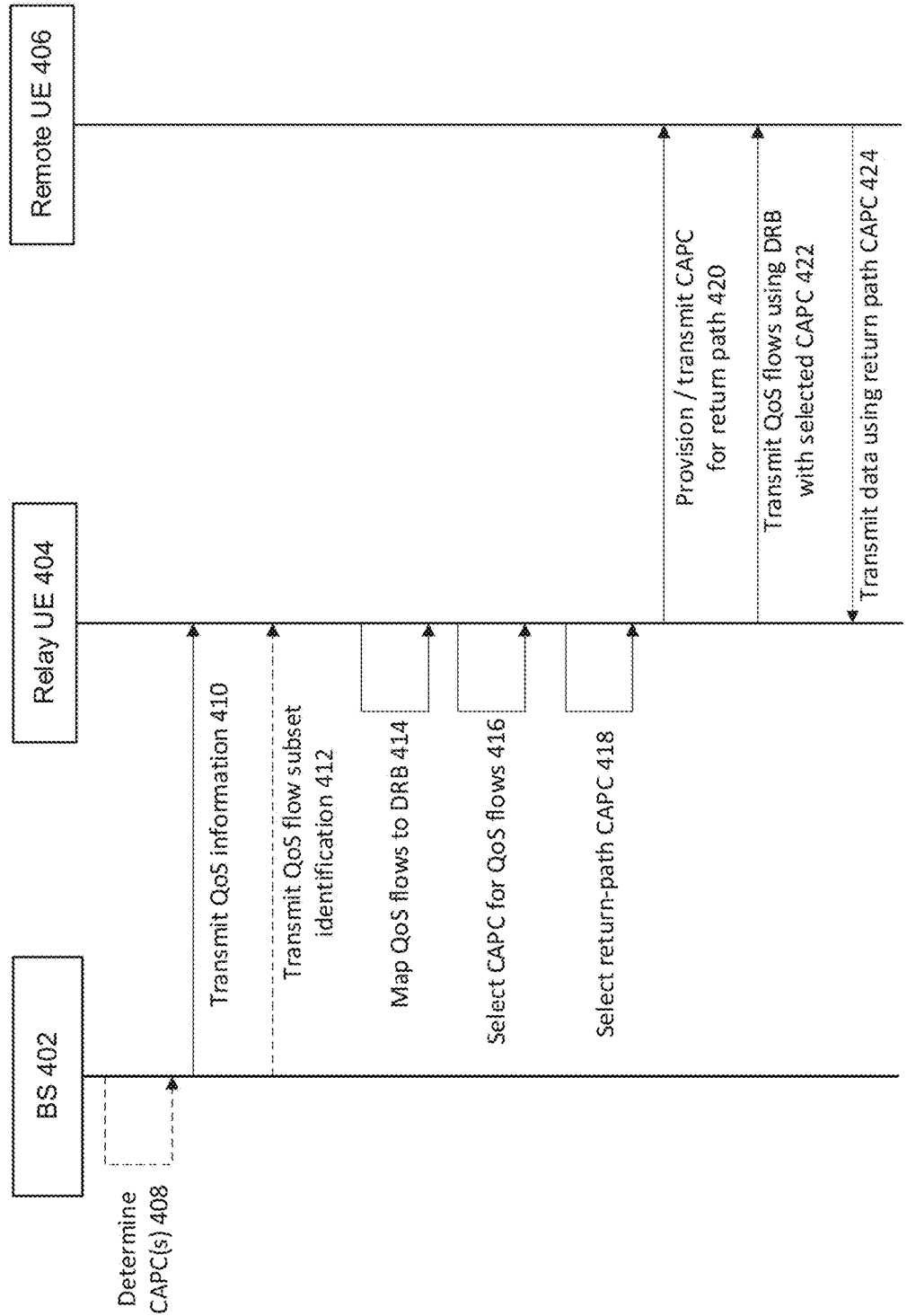
FIG. 4 illustrates a protocol diagram of a wireless communication method according to embodiments of the present disclosure.

As noted with respect to FIG. 3, in some embodiments of the present disclosure the UE 304 may act as a relay between two other devices, such as BS 302 and UE 306. Turning now to FIG. 4, illustrated is a protocol diagram of a wireless communication method 400, particularly a CAPC determination procedure, between a BS 402 (which may be a BS 105/205/302), a relay UE 404 (which may be a UE 115215/304) and a remote UE 406 (which may be a UE 115/215/306) according to some embodiments of the present disclosure. In the example of FIG. 4, relay UE 404 acts as a relay between BS 402 and remote UE 406. Relay UE 404 may be a layer 2 (L2) relay, where relay UE 404 decodes and demodulates signals from BS 402 and reencodes and remodulates the signals before transmitting them to remote UE 406. Alternately, relay UE 404 may be a layer 3 (L3) relay, where—as with an L2 relay—relay UE 404 decodes and demodulates signals from BS 402 and reencodes and remodulates the signals, but also performs ciphering and concatenates, segments, and reassembles user data before transmitting the signals to remote UE 406.

At action 408, BS 402 may determine the CAPC for transmitting multiple QoS flows on a DRB where relay UE 404 is an L2 relay. For example, if relay UE 404 is an L2 relay, BS 402 may determine the CAPC both for transmissions from relay UE 404 to remote UE 406, and for transmissions on a return path from remote UE 406 to relay UE 404. If UE relay 404 is an L3 relay, relay UE 404 may make its own CAPC determination based on one or more rules provisioned at some prior time either by the BS 402 or some other mechanism. Action 408 is illustrated as optional, since it may not occur for relay UE 404 operating as an L3 relay.

At action 410, BS 402 may transmit QoS information to relay UE 404, similar to as described above with respect to action 308 of FIG. 3. For example, the QoS information may indicate a set of rules for relay UE 404 to use in mapping the CAPCs of multiple QoS flows to a common CAPC for a DRB, such as where the relay UE 404 is an L3 relay. If relay UE 404 is an L2 relay, the QoS information may be an explicit signaling of CAPC indication for both the relay UE 404 to use on the DRB to the remote UE 406, as well as of the CAPC for the remote UE 406 to use for a return DRB to the relay UE 404. As noted elsewhere, the CAPC used for the sidelink may be different than the CAPC used for the connection to the BS 402 (i.e., the Uu connection). BS 402 may transmit the CAPC indication, for example, as part of a DCI message, or in a packet header, MAC CE, or RRC signal, etc.

At action 412, BS 402 may transmit information identifying a subset of QoS flows relevant to the CAPC determination to relay UE 404, similar to as was discussed above with respect to action 310 of FIG. 3. Like action 310, action 412 is illustrated as optional to the extent that another rule is implemented by the relay UE 404, remote UE 406, and/or BS 402.

At action 414, relay UE 404 maps a plurality of QoS flows to a DRB (i.e., an SLRB). The data in the QoS flows may originate from BS 302, reflecting the embodiment of FIG. 4 where the relay UE 404 is acting as a relay for data between the BS 302 and the remote UE 406. There may be one-to-many relationship between the QoS flows and a DRB. In some embodiments, the relay UE 404 may map the QoS flows to a DRB for the sidelink to the remote UE 406, and may correspond to all QoS flows from a DRB from the BS 402 to the relay UE 404, or may not fully correspond to all QoS flows from the BS 402. Similar to FIG. 3, though there may be multiple DRBs, and any number of QoS flows in any of them, discussion herein will describe exemplary cases with respect to a given DRB with multiple QoS flows mapped to it for sake of discussion.

At action 416, the relay UE 404 selects a CAPC for a sidelink transmission to remote UE 406 based on the QoS information transmitted by the BS at action 410. This may be, for example, a rule that the relay UE 404 uses to select a CAPC value for the sidelink connection (the DRB) from the relay 404 to the remote UE 406. In other embodiments where the QoS information was not a rule but rather an explicit CAPC signaling, the relay UE 404 may select the CAPC already provisioned by the BS 402. In other embodiments, the relay UE 404 may translate 5QI information included in the QoS flows from the BS 402 into respective PQI information and CAPC information (or directly from 5QI to CAPC) for the sidelink QoS flows of the DRB to the remote UE 406.

At action 418, UE 404 selects a CAPC for transmitting data on the return path on a return DRB, i.e. from remote UE 406 to relay UE 404 (e.g., for the relay 404 to then transmit on to BS 402 via a Uu connection with a potentially different CAPC). If relay UE 404 is an L2 relay, the relay UE 404 may select the CAPC determined by BS 402 at action 408 (which may have been signaled to the relay UE 404 at action 410). This may be optional for the relay UE 404 to make this selection for remote UE 406 in embodiments where the BS 402 is able to directly provision the remote UE 406 with a CAPC for the common return DRB as part of scheduling the resources for the sidelink connection. Otherwise, the remote UE 404 may receive the CAPC that the BS 402 determined to provision the remote UE 406 with on the common return DRB, and forward that determined information on to the remote UE 406 for provisioning.

If, instead, the relay UE 404 is an L3 relay, the relay UE 404 may apply a rule from those identified in the discussion relating to FIG. 1 above. For example, the CAPC value may be selected based on the highest priority of the QoS flows in the common return DRB, or based on the lowest priority of the QoS flows in the common return DRB, or based on the priority of a subset of the QoS flows identified by BS 402 signaling and/or of the QoS flows that share the same PQI (identified, for example, by a mapping between QoS flow identifier (QFI) and PQI), or based on the zone in which remote UE 406 is located, or based on a transmission type (e.g., broadcast, multicast, or unicast), or based on whether the transmission employs HARQ, or based on the link type, or based on traffic patterns and/or traffic history to name some examples.

At action 420, relay UE 404 may provision remote UE 406 with the CAPC determined from action 418 (as applicable) for use with the common return DRB. If the BS 402 provisioned the CAPC for the common return DRB to the remote UE 406 without using relay UE 404, then action 420 is optional.

At action 422, relay UE 404 transmits the QoS flows using the DRB with the CAPC selected at action 416 (e.g., as received from the BS 402 for which the UE 404 is acting as relay, while in some other embodiments the data may originate from the relay UE 404 and the relay aspect occurs with respect to data on the return path from remote UE 406 to the BS 402). For example, where three QoS flows (as just an exemplary value) are all mapped to the DRB, those three QoS flows are transmitted as part of that DRB to the remote UE 406.

At action 424, remote UE 406 transmits data (e.g., through QoS flows mapped to a DRB using a CAPC provisioned according to action 418/otherwise provisioned by BS 402) back to relay UE 404.

Figure 5:
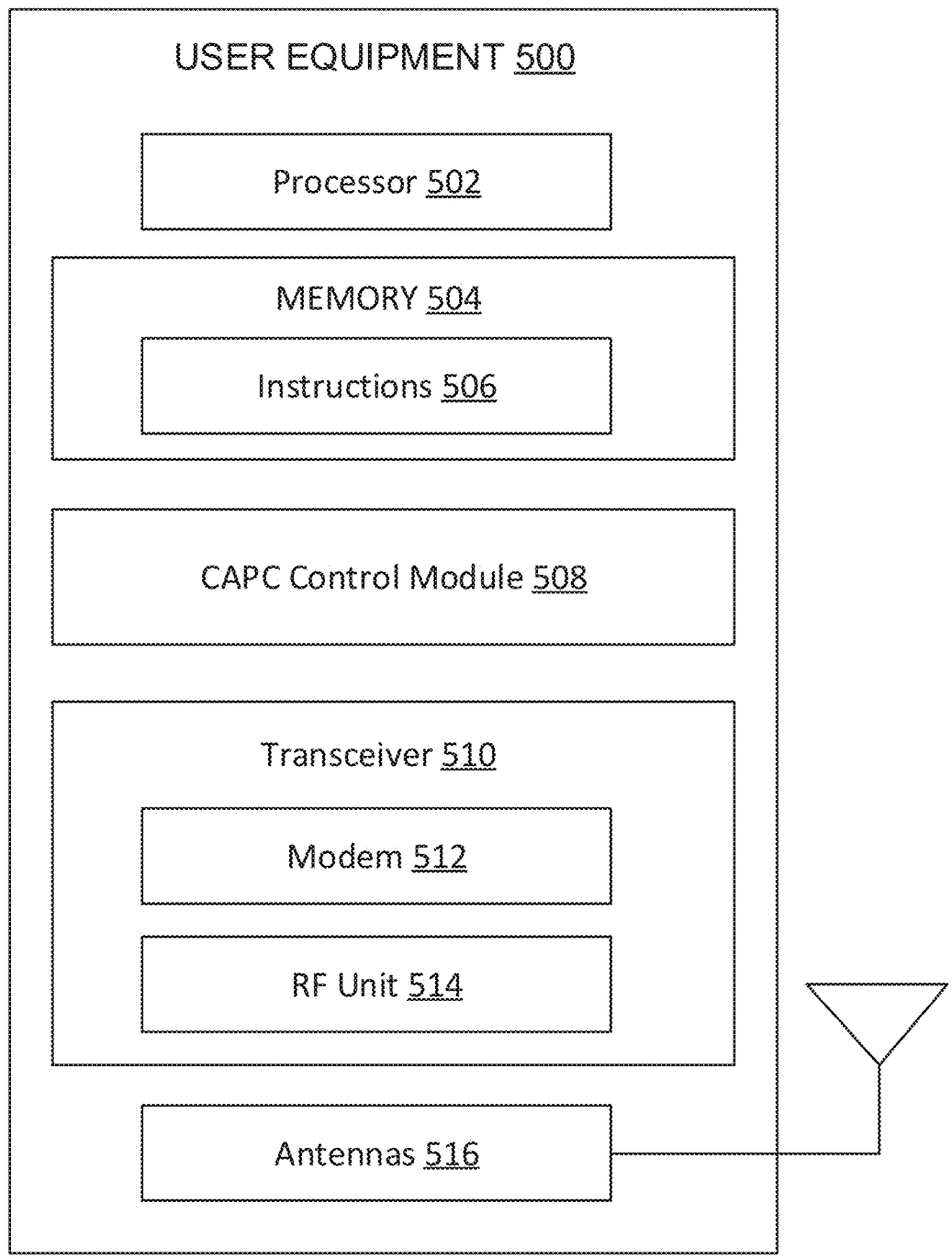
FIG. 5 is a block diagram of an exemplary UE according to embodiments of the present disclosure.

FIG. 5 is a block diagram of an exemplary UE 500 according to embodiments of the present disclosure. The UE 500 may be a UE 115/215/304/306/404/406 as discussed above in FIGS. 1-4. As shown, the UE 500 may include a processor 502, a memory 504, a CAPC control module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with embodiments of the present disclosure, for example, aspects of FIGS. 1-4 and 7-11. Instructions 506 may also be referred to as program code. The program code may be for causing a wireless communication device (or specific component(s) of the wireless communication device) to perform these operations, for example by causing one or more processors (such as processor 502) to control or command the wireless communication device (or specific component(s) of the wireless communication device) to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The CAPC control module 508 may be implemented via hardware, software, or combinations thereof. For example, CAPC control module 508 may be implemented as a processor, circuit, and/or instructions 506 stored in the memory 504 and executed by the processor 502. In some examples, the CAPC control module 508 can be integrated within the modem subsystem 512. For example, the CAPC control module 508 can be implemented by a combination of software components (e.g., executed by a DSP or a general processor) and hardware components (e.g., logic gates and circuitry) within the modem subsystem 512.

The CAPC control module 508 may be used for various aspects of the present disclosure, for example, aspects of FIGS. 1-4 and 7-11. The CAPC control module 508 is configured to communicate with other components of the UE 500 to select and/or otherwise apply a CAPC for transmitting multiple QoS flows on a DRB according the rules or direction (e.g., from a BS 105) described in the present disclosure, to map QoS flows to a DRB (e.g., multiple to a DRB and/or to different DRBs), and to transmit or retransmit multiple QoS flows with the selected CAPC as part of the DRB (e.g., over sidelink). The CAPC control module 508 may also be configured to receive one or more DL messages from a BS 105 for use in determining the CAPC, or indicating the CAPC values. The module may also be configured to select a CAPC for return path transmissions from a different UE 115 when acting as a relay, as described in the discussion of FIG. 4, and to receive transmissions on the return path from the different UE 115. The module may also be configured to determine whether a timer has expired, start a timer, cancel a timer, stop a timer, determine whether a transmission counter has reached a threshold, reset a transmission counter, restart a random access procedure, trigger RLF, and/or perform other functionalities related to the CAPC determination procedures of a UE described in the present disclosure.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504, and/or the CAPC control module 508 according to a modulation and coding scheme (MCS) (e.g., a low-density parity check (LDPC) coding scheme, a turbo coding scheme, a convolutional coding scheme, a digital beamforming scheme, etc.). The RF unit 514 may be configured to process (e.g., perform analog to digital conversion or digital to analog conversion, etc.) modulated/encoded data (e.g., UL data bursts, RRC messages, configured grant transmissions, ACK/NACKs for DL data bursts) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 500 to enable the UE 500 to communicate with other devices.

The RF unit 514 may provide the modulated and/or processed data (e.g., data packets or, more generally, data messages that may contain one or more data packets and other information) to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., system information message(s), RACH message (s) (e.g., DL/UL scheduling grants, DL data bursts, RRC messages, ACK/NACK requests) to the CAPC control module 508 for processing. The antennas 516 may include multiple antennas of similar or different designs in order to sustain multiple transmission links. The RF unit 514 may configure the antennas 516.

In an embodiment, the UE 500 can include multiple transceivers 510 implementing different RATs (e.g., NR and LTE). In an embodiment, the UE 500 can include a single transceiver 510 implementing multiple RATs (e.g., NR and LTE). In an embodiment, the transceiver 510 can include various components, where different combinations of components can implement different RATs.

Figure 6:
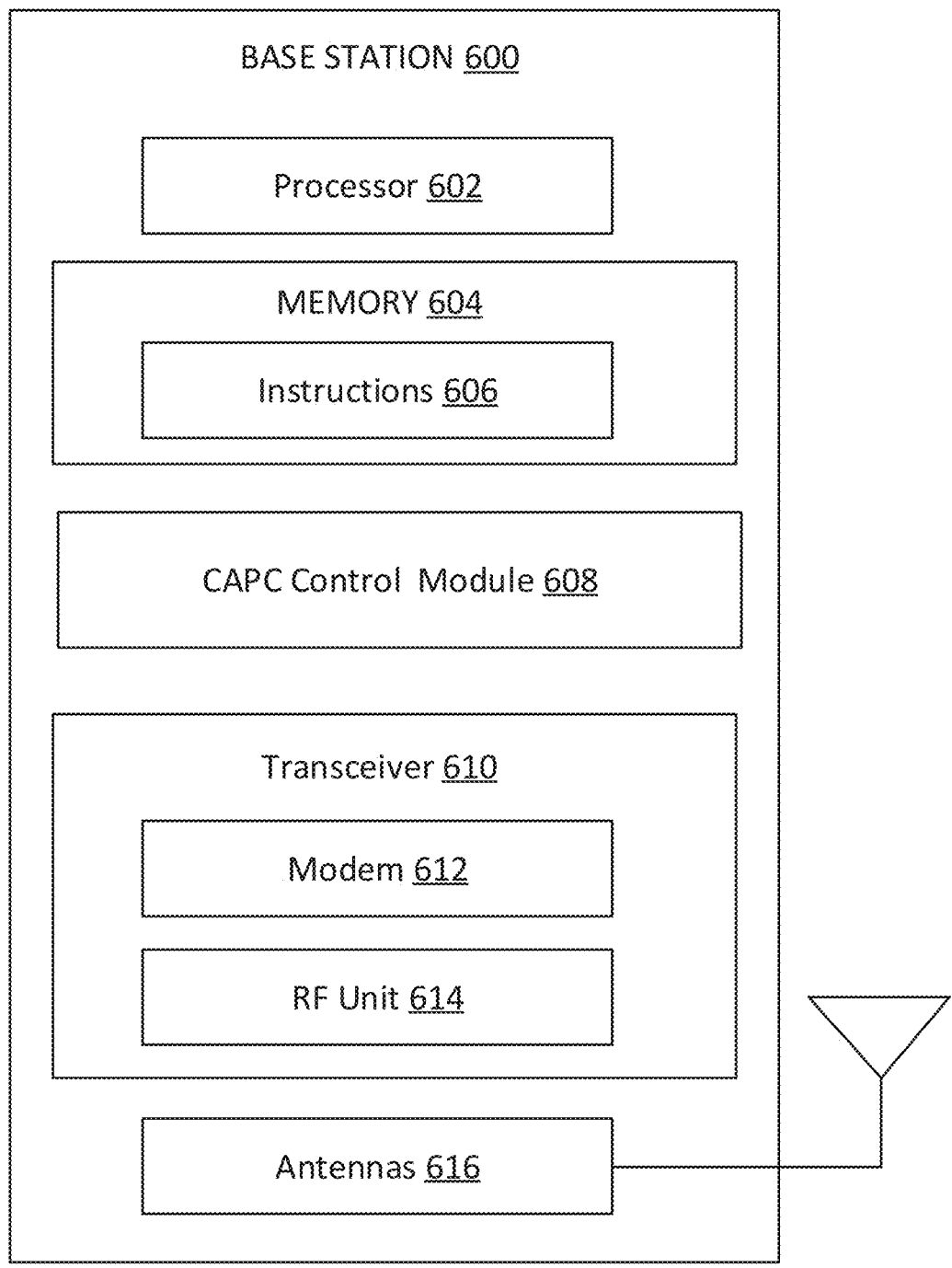
FIG. 6 is a block diagram of an exemplary BS according to embodiments of the present disclosure.

FIG. 6 is a block diagram of an exemplary BS 600 according to embodiments of the present disclosure. The BS 600 may be a BS 105/205/302/402 as discussed above in FIGS. 1-4. As shown, the BS 600 may include a processor 602, a memory 604, a CAPC control module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 1-4 and 7-11. Instructions 606 may also be referred to as code, which may be interpreted broadly to include any type of computer-readable statement(s) as discussed above with respect to FIG. 5.

The CAPC control module 608 may be implemented via hardware, software, or combinations thereof. For example, the CAPC control module 608 may be implemented as a processor, circuit, and/or instructions 606 stored in the memory 604 and executed by the processor 602. In some examples, the CAPC control module 608 can be integrated within the modem subsystem 612. For example, the CAPC control module 608 can be implemented by a combination of software components (e.g., executed by a DSP or a general processor) and hardware components (e.g., logic gates and circuitry) within the modem subsystem 612.

The CAPC control module 608 may be used for various aspects of the present disclosure, for example, aspects of FIGS. 1-4 and 7-11. The CAPC control module 608 may be configured to communicate with other components of the BS 600 to determine CAPC(s) for transmitting multiple QoS flows mapped to a DRB by a first UE 115 to a second UE 115, and/or for transmitting on the return path from the second UE 115 to the first UE 115. The CAPC control module may also be configured to transmit indication(s) for use by a UE 115 in determining an appropriate CAPC according to the rules described in this disclosure. For example, instead of transmitting a CAPC value, the CAPC control module 608 may transmit a set of rules for use by the UE 115, or other information related to the CAPC. The CAPC control module 608 may also be configured to identify a subset of QoS flows for use by a UE 115 in applying one or more CAPC selection rules. The CAPC control module 608 may also determine whether a timer has expired, start a timer, cancel a timer, determine whether a transmission counter has reached a threshold, reset a transmission counter, terminate a random access procedure, and/ or perform other functionalities related to the CAPC determination for DRBs having multiple QoS flows described in the present disclosure.

As shown, the transceiver 610 may include the modem subsystem 612 and the RF unit 614. The transceiver 610 can be configured to communicate bi-directionally with other devices, such as the UEs 115 and/or 300 and/or another core network element. The modem subsystem 612 may be configured to modulate and/or encode data according to a MCS (e.g., a LDPC coding scheme, a turbo coding scheme, a convolutional coding scheme, a digital beamforming scheme, etc.). The RF unit 614 may be configured to process (e.g., perform analog to digital conversion or digital to analog conversion, etc.) modulated/encoded data (e.g., RRC messages, DL data of multiple QoS flows mapped to the same DRB, etc.) from the modem subsystem 612 (on outbound transmissions) or of transmissions originating from another source, such as a UE 115 or 300. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 600 to enable the BS 600 to communicate with other devices.

The RF unit 614 may provide the modulated and/or processed data, (e.g., data packets or, more generally, data messages that may contain one or more data packets and other information) to the antennas 616 for transmission to one or more other devices. This may include, for example, communication with a camped UE 115 or 300 according to embodiments of the present disclosure. The antennas 616 may further receive data messages transmitted from other devices and provide the received data messages for processing and/or demodulation at the transceiver 610. The transceiver 610 may provide the demodulated and decoded data (e.g., RRC messages, UL data of multiple QoS flows mapped to the same DRB, UL data, etc.) to the CAPC control module 608 for processing. The antennas 616 may include multiple antennas of similar or different designs in order to sustain multiple transmission links.

In an embodiment, the BS 600 can include multiple transceivers 610 implementing different RATs (e.g., NR and LTE). In an embodiment, the BS 600 can include a single transceiver 610 implementing multiple RATs (e.g., NR and LTE). In an embodiment, the transceiver 610 can include various components, where different combinations of components can implement different RATs.

Figure 7A:
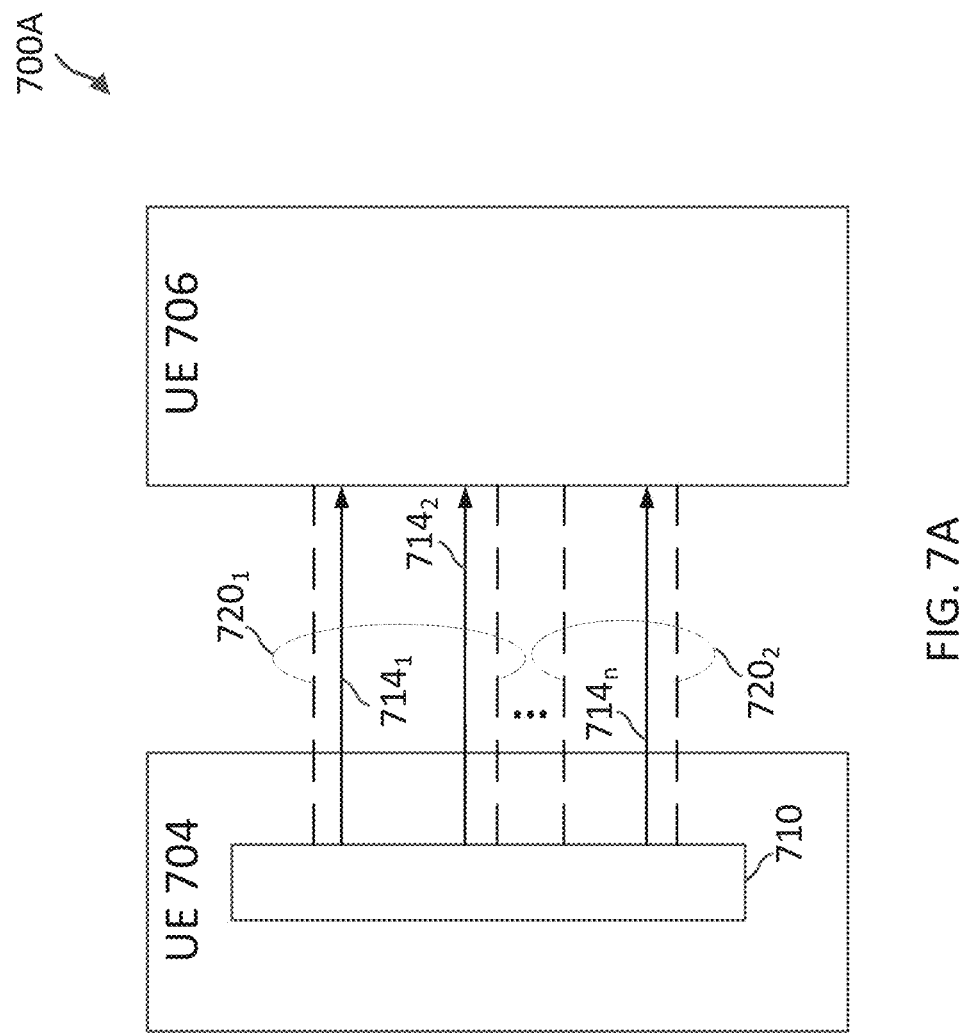
FIG. 7A illustrates a wireless communication network interaction according to embodiments of the present disclosure.

Turning now to FIG. 7A, a wireless communication network interaction 700A is illustrated according to some embodiments of the present disclosure. For example, illustrated are some logical flows (e.g., via one or multiple sidelinks) between a UE 704 and a UE 706. While there may be many UEs to which embodiments of the present disclosure may apply, only two are illustrated herein for simplicity of illustration and discussion. The UEs 704 and 706 may be examples of the UEs 115/215/304/306/404/406 discussed in herein. Additional operations and functions are performed between the two UEs 704 and 706 illustrated in FIG. 7A in addition to the CAPC determination aspects described herein.

At UE 704, data originating at the UE (e.g., from an application) is mapped by mapping function 710 onto QoS flows $714_1$-$714_n$, which are subsequently mapped to DRBs $720_1$ and $720_2$ for transport to UE 706. While illustrated as a single mapping function 710, the mapping function 710 may be any combination of filters implemented in software and/or hardware to accomplish the mapping result illustrated herein. As just one example, the QoS flows $714_1$ and $714_2$ may be mapped to a first DRB $720_1$, and the QoS flow $714_n$ may be mapped to a DRB $720_2$. As illustrated, therefore, there is a one-to-many relationship between the DRB $720_1$ and the QoS flows $714_1$ and $714_2$ mapped to it.

The data is transmitted via the DRBs $720_1$ through $720_2$ to the UE 706. Because of the one-to-many nature, however, a given DRB (such as DRB $720_1$ in the illustrated example) may have multiple QoS flows with respective QFIs (with each QFI being based, for example, on a corresponding PQI value). The UE 704 determines what CAPC to apply for the DRB on a sidelink communication to UE 706, which may be accomplished according to embodiments of the present disclosure. This may be accomplished, for example, by applying one or more rules as discussed above and further below.

Figure 7B:
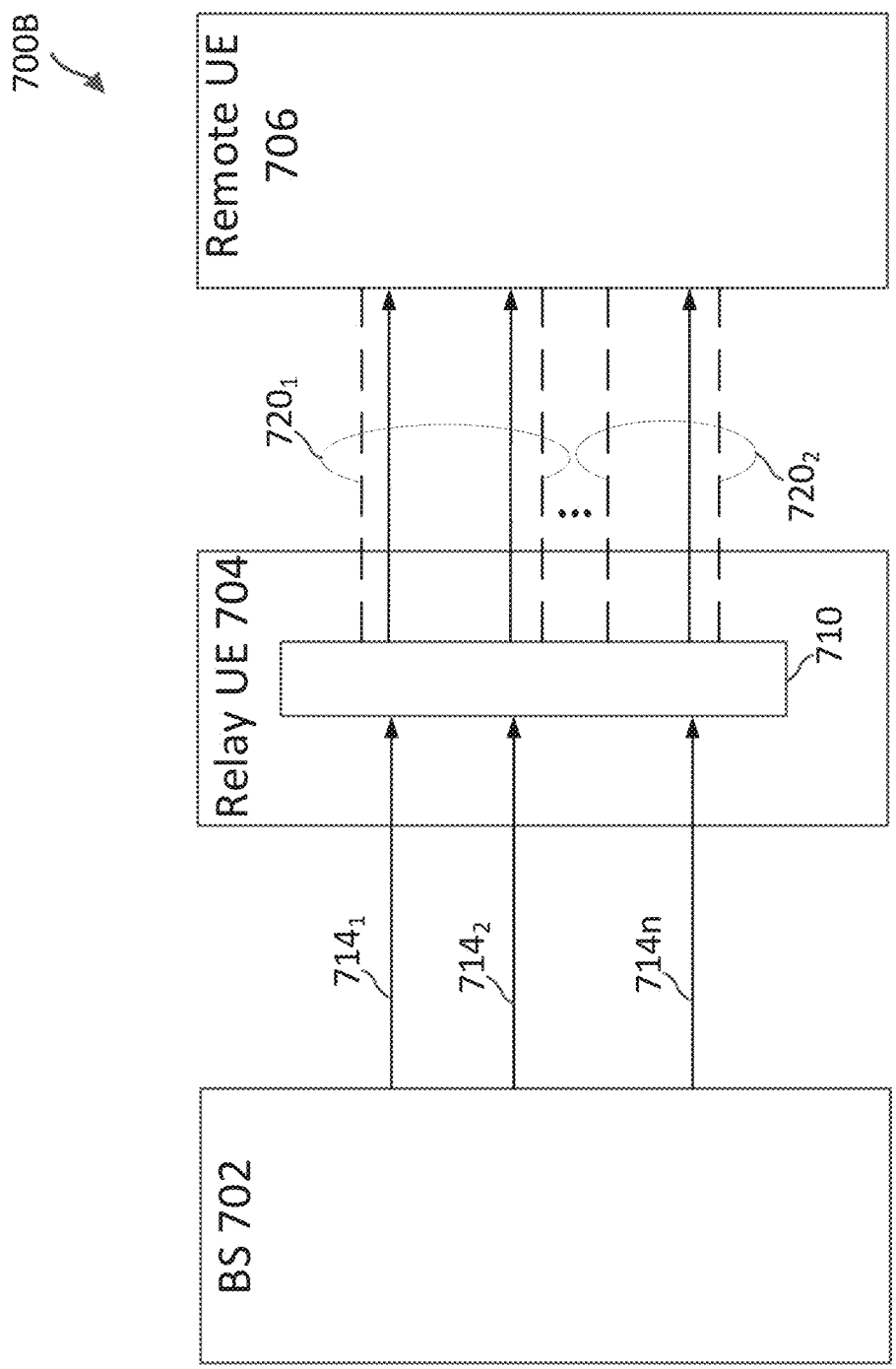
FIG. 7B illustrates a wireless communication network interaction according to embodiments of the present disclosure.

Turning now to FIG. 7B, a wireless communication network interaction 700B is illustrated according to some embodiments of the present disclosure. For example, illustrated are some logical flows between a BS 702, a relay UE 704, and a remote UE 706, where UE 704 acts as a relay between BS 702 and remote UE 706. While there may be several BSs 702 and many UEs 704 and 706 to which embodiments of the present disclosure may apply, only one BS 702 and two UEs 704 and 706 are illustrated herein for simplicity of illustration and discussion. The BS 702 may be a BS 105/205/302/402 and the relay UE 704 and remote UE 706 may be examples of the UEs 115/215/304/306/404/406 discussed in herein. Similar numbering to that used in FIG. 7A is used for FIG. 7B for sake of illustration. Additional operations and functions are performed between the three entities illustrated in FIG. 7B in addition to the CAPC determination aspects described herein.

BS 702 may transmit data intended ultimately for remote UE 706 as a series of QoS flows $714_1$-$714_n$ to relay UE 704. At relay UE 704, the QoS flows $714_1$-$714_n$ originating at BS 702 are mapped by mapping function 710 onto DRBs $720_1$ and $720_2$ for transport to remote UE 706. While illustrated as a single mapping function 710, the mapping function 710 may be any combination of filters implemented in software and/or hardware to accomplish the mapping result illustrated herein. As just one example, the QoS flows $714_1$ and $714_2$ may be mapped to a first DRB $720_1$, and the QoS flow $714_n$ may be mapped to a DRB $720_2$. As illustrated, therefore, there is a one-to-many relationship between the DRB $720_1$ and the QoS flows $714_1$ and $714_2$ mapped to it.

The data is to be transmitted via the DRBs $720_1$ through $720_n$ to the remote UE 706. Because of the one-to-many nature, however, a given DRB (such as DRB $720_1$ in the illustrated example) may have multiple QoS flows with respective QFIs. In some embodiments, the relay UE 704 may determine what CAPC to apply for the DRB from the relay UE 704 to the remote UE 706 for data being relayed from the BS 702. This may be based, for example, on one or more rules provisioned at some prior time to the relay UE 704 (e.g., where the relay UE 704 is an example of an L3 relay as discussed herein). This may also include, for the L3 relay examples, the relay UE 704 also determining what CAPC for the remote UE 706 to use on a common return DRB to the relay UE 704, and provisioning the same to the remote UE 706. In some examples, the relay UE 704 may use information from the QoS flows $714_1$ and $714_n$ (such as 5QI or other indicator(s)) to translate to PQI values and from there to CAPC values from which to select (while in other embodiments the relay UE 704 may translate from 5QI to CAPC). In other embodiments, such as for L2 relay examples, the BS 702 determining what CAPC to apply for the DRB on a sidelink communication from relay UE 704 to remote UE 706 as well as for the common return DRB on sidelink communication from remote UE 706 to relay UE 704. This may be accomplished, for example, by applying one or more rules as discussed above and further below.

FIG. 8 illustrates an exemplary table format 800 for a mapping relationship according to some embodiments of the present disclosure, which may provide a mapping between a CAPC and the various 5QIs. This is exemplary, and other mappings may be applicable as well, and benefit from, aspects of the present disclosure. For example, the same or a similar mapping may exist for CAPCs to various PQIs. In other examples, a further mapping of 5QIs to PQIs may be used instead or in addition. As illustrated, a first column 802 lists the different CAPCs. A second column lists the corresponding 5QI(s) that correspond to a given CAPC. This correspondence is illustrated by rows 806. In the illustrated examples, therefore, CAPC 1 may map the several 5QIs listed in the same row 806 as the CAPC 1, and so on through CAPC 4. In the illustrated example table 800, the lower numbers have higher priority than the higher numbers. In similar fashion, a CAPC may map to several PQIs for use in embodiments of the present disclosure for sidelink communications.

Figure 9:
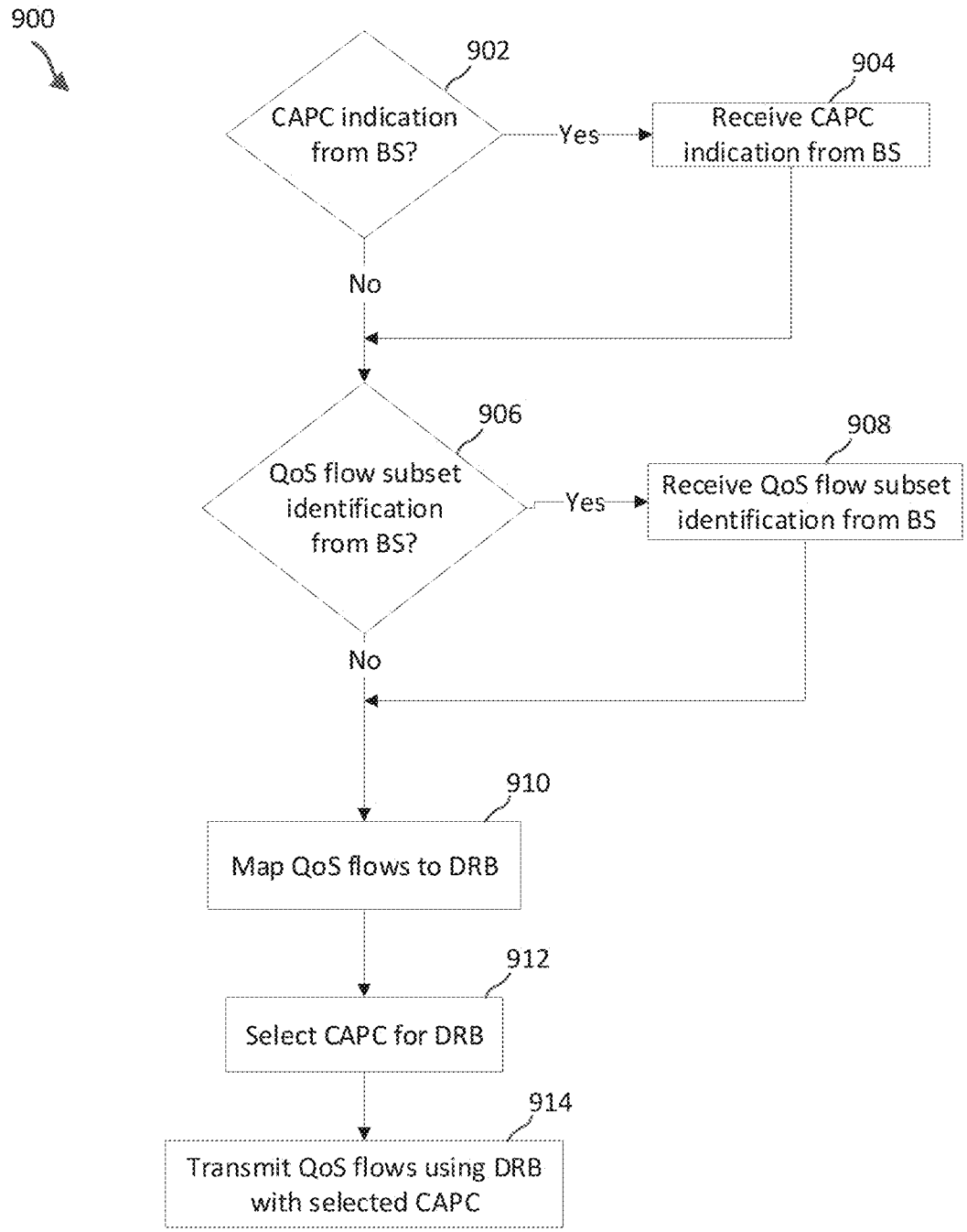
FIG. 9 illustrates a flow diagram of a wireless communication method according to embodiments of the present disclosure.

FIG. 9 illustrates a flow diagram of a wireless communication method 900 for determining and using a CAPC for sidelink transmission in situations where there may be multiple QoS flows on a DRB, according to some embodiments of the present disclosure. Aspects of the method 900 can be executed by a wireless communication device, such as the UEs 115, 215, 304, 306, 404, 406, 500, 704 and/or 706, utilizing one or more components, such as the processor 502, the memory 504, the CAPC control module 508, the transceiver 510, the modem 512, the one or more antennas 516, and various combinations thereof. As illustrated, the method 900 includes a number of enumerated steps, but embodiments of the method 900 may include additional steps before, during, after, and in between the enumerated steps. Further, in some embodiments, one or more of the enumerated steps may be omitted or performed in a different order.

At decision block 902, if a BS 105 is configured to signal information relevant to the CAPC determination at the UE 115 (if, for example, the UE is configured for mode 1 sidelink communication), then the method 900 proceeds to block 904.

At block 904, the UE 115 receives a CAPC indication from the BS. The indication may be a determined CAPC for the DRB, a set of rules to be applied by the UE 115 in determining the CAPC, a 5QI, a PQI, and/or other information for the UE 115 to apply with respect to one or more rules to determine the CAPC for the DRB. The indication may be received, for example, as part of a DCI message. The method 900 proceeds to decision block 906 as discussed further below.

Returning to decision block 902, if no CAPC indication is expected form the BS (for example, if the UE is configured for mode 2 sidelink communication), the method 900 progresses to decision block 906.

At decision block 906, if the BS 105 is configured to identify for the UE 115 a subset of QoS flows, the method proceeds to block 908.

At block 908, the UE 115 may receive a signal from the BS 105 identifying a subset of QoS flows for use by the UE 115 in determining the CAPC. The indication may include a list of the QoS flows that comprise the subset, or some smaller representation such as a short bit pattern that the UE 115 uses to look up, in a corresponding table, what subset the pattern identifies. The UE 115 may be configured to implement the subset signaled by the BS 105 to determine the CAPC for the DRB based on the lowest or highest priority from among the QoS flows identified by the BS 105. The method 900 proceeds from block 809 to block 910 as discussed further below.

Returning to decision block 906, if no QoS flow subset identification is expected from the BS 105, the method 900 proceeds to block 910.

At block 910, the UE 115 maps the QoS flows onto a DRB as described in relation to FIG. 7A.

At block 912, the UE 115 selects a CAPC for transmitting the QoS flows on the DRB. In some embodiments, the selection may be based upon a rule (e.g., mode 2 communication) or may be applying the CAPC already explicitly signaled from the BS 105 (e.g., mode 1 communication). For example, the rule may be that different QoS flows carried on a DRB are mapped by the UE 115 based on each QoS flow in the DRB having the same access priority. As another example, the rule may be that the UE 115 select the CAPC based on the lowest access priority of the QoS flows on the DRB. As another example, the rule may be that the UE 115 select the CAPC based on the highest access priority of the QoS flows on the DRB. As another example, the rule may be that the 115 UE select the CAPC based on the lowest or highest priority from among a subset of QoS flows on the DRB, where the subset is signaled by the BS. As another example, the rule may be that the UE 115 select the CAPC based on the priority of the greatest number of QoS flows on the DRB that have the same priority.

As another example, the UE 115 may need to transmit data to a first receiver UE 115 and a second receiver UE 115, where the receiver UEs 115 include multiple, different QoS flows carried on two different DRBs. The rule may be that the CAPC for the two DRBs be different. As another example, the rule may be that the UE select the CAPC for transmitting the data to the first receiver UE 115 based on the second receiver UE 115 being in a different zone than the first receiver UE 115. As another example, the rule may be that the UE 115 select the CAPC based on the type of transmission to be performed, e.g., broadcast, multicast, or unicast. The rule may be that among broadcast, multicast, and unicast, the UE selects the highest priority among the three for broadcast, the second highest priority among the three for multicast, and the lowest priority among the three for unicast. As another example, the rule may be that the UE 115 select the CAPC based on whether the data is transmitted using hybrid automatic request repeat (HARQ).

As another example, if the UE 115 receives a CAPC indication from a BS 115 at block 904, the BS 105 may signal the CAPC to use when a QoS flow is added or removed from the QoS flows mapped to the DRB. The UE 115 may also receive the CAPC from the BS 105, where the CAPC is based on the zone in which a receiver UE 115 is located. For example, if a first receiver UE 115 is located in a different zone than the second UE receiver UE 115, the BS 105 may signal a different CAPC for transmitting on the DRB to the second receiver UE 115 than the CAPC for the first receiver UE 115. The BS 105 may also signal a CAPC based on the HARQ mode used for transmission. For example, if the transmission to the second receiver UE 115 uses a different HARQ mode than the transmission to the first receiver UE 115, the BS 105 may signal to use a different CAPC for transmission to the first receiver UE 115 than to the second receiver UE 115. As another example, the BS may signal to the UE 115 a different CAPC for transmitting data to a receiver UE 115 than for transmitting data from the receiver UE 115 back to the UE 115 (e.g., the BS 105 may signal a different CAPC for transmitting on to the BS 105 a Uu link than between UEs on a PC5 link). As another example, the UE 115 may receive from the BS 105 an access priority mapping rule at block 904 for the DRB for use with the QoS flows. The access priority mapping rule may include multiple access priority mapping rules, which may be updated dynamically. For example, the BS 105 may configure multiple access priority rule mappings through an RRC message, and dynamically update the rules in a media access layer (MAC) control element (CE). The update may be based on the traffic patterns of the QoS flows and/or the traffic history of the flows.

In some embodiments, the UE 115 may receive one or more packets belonging to a QoS flow that the UE 115 has not received in the DRB (i.e., reflective QoS). In such situations, the UE 115 may update the access priority of the DRB according to a known rule (such as one of the above-noted rules). The UE 115 may receive the CAPC for this new QoS flow, such as in the received packet, in the service data adaptation protocol (SDAP) header, the packet data convergence protocol (PDCP) header, MAC CE, RRC signaling, or PDCP control PDU. This may instead, or additionally, include the UE 115 receiving the PQI for this QoS flow, such as in a received packet, or SDAP header, PDCP header, MAC CE, RRC signaling, or PDCP control PDU. The CAPC for the DRB may be updated according to one or more of the above rules with this new information for the new QoS flow. Further, when the BS 105 adds or removes QoS flow(s) for the DRB, the UE 115 may update the CAPC of the DRB based on the rule(s) in effect (such as from among those discussed above). Further, whenever the CAPC changes with respect to the DRB for sidelink transmission from the UE 115, the new CAPC may be applied to subsequent sidelink transmissions for the DRB, or alternatively may begin application when received. In general, when a new QoS flow is added, or when an existing QoS flow is removed from a DRB, the CAPC may be signaled to the UE 115 (or, alternatively to the CAPC, the PQI for the QoS flow in which case the UE 115 may perform a mapping between the received PQI and a CAPC to use). Alternately, the UE 115 itself may determine the CAPC (e.g., by applying one or more of the rules herein) when a QoS flow is added or removed. In another example, when a PDU is received by the UE 115 from a BS 105 on a PC5 link and retransmitted to the second UE on a Uu link, the rule may be that UE 115 use a different CAPC for the Uu link than for the PC5 link.

At block 914, the UE 115 transmits to a different UE 115 the QoS flows using the DRB with the CAPC selected at block 912, on a sidelink to the different UE 115 (for example, a PC5 link).

Figure 10:
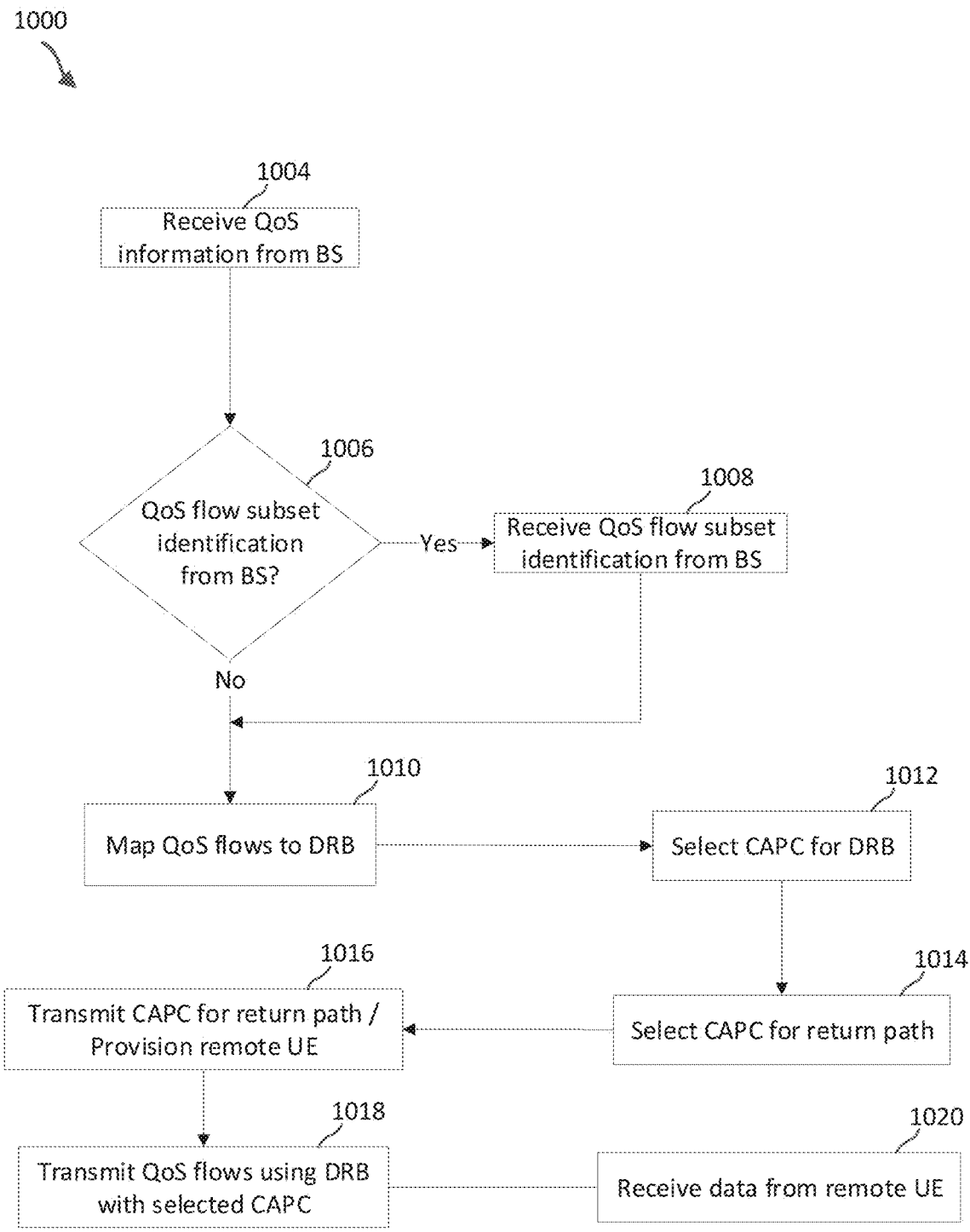
FIG. 10 illustrates a flow diagram of a wireless communication method according to embodiments of the present disclosure.

FIG. 10 illustrates a flow diagram of a wireless communication method 1000 for relaying data between devices by determining and using a CAPC for sidelink transmission in situations where there may be multiple QoS flows on a DRB, according to some embodiments of the present disclosure. Aspects of the method 1000 can be executed by a wireless communication device, such as the UEs 115, 215, 304, 306, 404, 406, 500, 704 and/or 706 utilizing one or more components, such as the processor 502, the memory 504, the CAPC control module 508, the transceiver 510, the modem 512, the one or more antennas 516, and various combinations thereof. The UE 115 (e.g., "relay UE" 115) may be engaged in sidelink communication with a different UE 115, and act, for example, as an L2 or L3 relay between a BS 105 and a remote UE 115. For an L2 relay, the BS 105 coordinates at least some scheduling operations between the UEs 115, while for an L3 relay the relay UE 115 may make CAPC and scheduling determinations without configuring from the BS 105. As illustrated, the method 1000 includes a number of enumerated steps, but embodiments of the method 1000 may include additional steps before, during, after, and in between the enumerated steps. Further, in some embodiments, one or more of the enumerated steps may be omitted or performed in a different order.

At block 1004, the UE 115 receives QoS information from the BS 105. When the relay UE 115 is an L2 relay, the QoS information may contain a determined CAPC for the relay UE 115 to use for transmitting the QoS flows on the DRB to remote UE 115 (e.g., on a PC5 link), as well as a determined CAPC for the remote UE 115 to use for transmitting data on the return path to the relay UE 115 (e.g., on a PC5 link). If the relay UE 115 is an L3 relay, the QoS information may contain a set of rules for the relay UE 115 to use in determining a CAPC to use with the QoS flows on the DRB to remote UE 115, as well as to aid the relay UE 115 in determining a CAPC for transmissions from the remote UE 115 to the relay UE 115 on the return path. The indication may be received, for example, as part of a DCI message.

At decision block 1006, the BS 105 may be configured to identify for the relay UE 115 a subset of QoS flows for determining the CAPC for one or both of the path to the remote UE 115 and the return path from the remote UE 115 (i.e., if relay UE 115 is an L3 relay). If so, the method 1000 proceeds to block 1008.

At block 1008, the relay UE 115 may receive a signal from the BS 105 identifying a subset of QoS flows for use by the relay UE 115 in determining the CAPC for one or both sidelinks (to the remote UE 115 and on return from it). The indication may include a list of the QoS flows that comprise the subset, or some smaller representation such as a short bit pattern that the relay UE 115 uses to look up, in a corresponding table, what subset the pattern identifies. The relay UE 115 may be configured to look to the subset signaled by the BS 105 to determine the CAPC for the DRB based on the lowest or highest priority from among the QoS flows identified by the BS 105, for example. The method 1000 proceeds to block 1010 as discussed further below.

Returning to decision block 1006, if no QoS flow subset identification is expected from the BS 105, the method 1000 proceeds to block 1010.

At block 1010, the relay UE 115 maps the QoS flows onto a DRB for the path to remote UE 115 as described in relation to FIG. 7B.

At block 1012, the relay UE 115 selects a CAPC for transmitting the QoS flows on the DRB to the remote UE 115 based on the QoS information received from BS 105. This may be, for example, one or more rules that the relay 115 uses to select the CAPC, while in other examples this may be to select the CAPC determined by the BS 105 and received at block 1004.

At block 1014, the relay UE 115 selects a CAPC for the remote UE 115 to use when transmitting the QoS flows on the common return DRB from the remote UE 115 to the relay UE 115. If the relay UE 115 is an L2 relay, the relay UE 115 may select the CAPC determined by the BS 105 and received at block 1004. If the relay UE 115 is an L3 relay, the relay UE 115 may instead apply one or more rules for selecting the CAPC for the common return DRB on the return path from the remote UE 115.

At block 1016, the relay UE 115 transmits to the remote UE 115 the CAPC to be used for transmissions from the remote UE 115 on the return path to provision the remote UE 115 with the CAPC. This may occur, for example, where the relay UE 115 is an L3 relay. If an L2 relay, the provisioning may have been done by the BS 105 apart from the relay UE 115, or otherwise provisioned by the BS 105 through the relay 115.

At block 1018, the relay UE 115 transmits to the remote UE 115 the QoS flows using the DRB with the CAPC selected at block 1012, on, for example, a PC5 link.

At block 1020, the relay UE 115 receives from the remote UE 115 data transmitted on the return path (e.g., on a return PC5 link) using the CAPC selected at block 1014.

Figure 11:
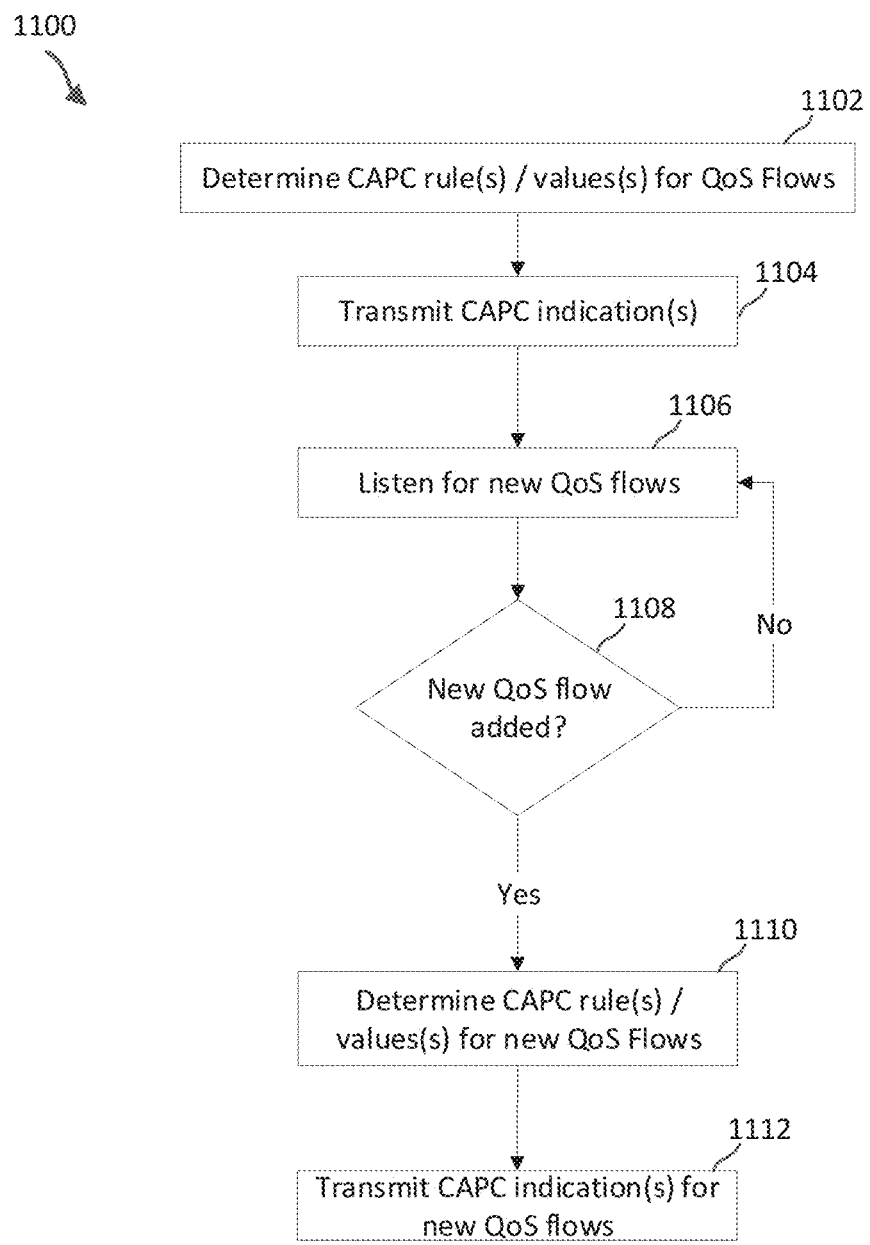
FIG. 11 illustrates a flow diagram of a wireless communication method according to embodiments of the present disclosure.

FIG. 11 illustrates a flow diagram of a wireless communication method 1100 for determining and using a CAPC for a transmission in situations where there may be multiple QoS flows on a DRB, according to some embodiments of the present disclosure. Aspects of the method 1100 can be executed by a wireless communication device, such as the BSs 105, 205, 302, 402, 600, and/or 702 utilizing one or more components, such as the processor 602, the memory 604, the CAPC control module 608, the transceiver 610, the modem 612, the one or more antennas 616, and various combinations thereof. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At block 1102, a BS 105 may determine CAPC rules (e.g., for mode 2 and/or L3 relays) and/or values (e.g., for mode 1 and/or L2 relays) for use by a UE 115 in transmitting multiple QoS flows mapped to a DRB over a sidelink connection to a second UE 115. Rules may include any of the rules discussed above (e.g., in the discussion of FIG. 1). The BS 105 may also, for example in mode 1 communications, itself determine a CAPC value for use by the UE 115 on the DRB of the sidelink. If UE 115 is, as another example, an L2 relay, the BS 105 may also directly determine a CAPC value for use by a remote UE 115 engaged in sidelink communication with the relay UE 115 to transmit data on the return path to relay UE 115.

At block 1104, the BS 105 transmits the QoS information determined at block 1102 to the UE 115. The QoS information may include one or more determined CAPCs, 5QIs, PQIs, subset information, rules, or other information for a UE 115 to apply with respect to one or more rules described herein, and may be transmitted, for example, as part of a DCI message.

As noted previously, in some embodiments QoS flows may be added or removed on the sidelinks. In scenarios where the BS 105 aids in scheduling and CAPC determination, the BS 105 be notified of QoS flow changes. Accordingly, at block 1106, the BS 105 listens for an indication that a new QoS flow has been added to the DRB for a sidelink between two UEs.

At decision block 1108, the BS 105 may detect that a new QoS flow has been added. If no new QoS flow has been added, the returns to block 1106, where the BS 105 may continue listening for an indication that a new QoS flow has been added. If the BS 105 detects that a new QoS flow has been added, the method proceeds to block 1110.

At block 1110, the BS 105 may determine new CAPC values or rules in response to detecting a new QoS flow. The CAPC for the DRB may be updated according to one or more of the above rules with this new information for the new QoS flow.

At block 1112, the BS transmits a CAPC indication containing the updated rules and/or CAPC values determined at block 1110. The updated indication may be transmitted in a packet header, an SDAP header, a PDCP header, a MAC CE, an RRC message, or a PDCP control PDU. The BS may instead, or additionally, transmit the PQI for the new QoS flow. When the CAPC changes with respect to the DRB for sidelink transmission from the UE, the new CAPC may be applied to subsequent sidelink transmissions for the DRB, or alternatively may begin application when received. In general, when a new QoS flow is added, or when an existing QoS flow is removed from a DRB, the CAPC may be signaled to the UE.

Further aspects of the present disclosure include the following:

1. A method of wireless communication comprising:
    mapping, by a first user equipment (UE), a first plurality of quality of service flows (QoS flows) to a first data radio bearer (DRB) between the first UE and a second UE;
    determining, by the first UE, a channel access priority class (CAPC) for the first DRB for transmitting a first data packet based on a rule applied to the first plurality of QoS flows mapped to the first DRB; and
    transmitting, by the first UE to the second UE, the first data packet with the determined CAPC.

2. The method of aspect 1, wherein the first plurality of QoS flows mapped to the first DRB comprises a corresponding plurality of CAPCs.

3. The method of aspect 2, wherein the first plurality of QoS flows are mapped to the first DRB based at least on the corresponding plurality of CAPCs being the same among the first plurality of QoS flows, the determining the CAPC for the first DRB being based at least on the same CAPC.

4. The method of aspect 2, wherein a first CAPC from among the plurality of CAPCs comprises a lower access priority than a second CAPC from among the plurality of CAPCs, the determining further comprising:
    determining the first CAPC based at least on the first CAPC comprising the lower access priority.

5. The method of aspect 2, wherein a first CAPC from among the plurality of CAPCs comprises a higher access priority than a second CAPC from among the plurality of CAPCs, the determining further comprising:
    determining the first CAPC based at least on the first CAPC comprising the higher access priority.

6. The method of aspect 2, wherein the determining further comprises:

identifying, by the first UE, a first subset of QoS flows from among the first plurality of QoS flows having first common CAPC; and identifying, by the first UE, a second subset of QoS flows from among the first plurality of QoS flows having a second common CAPC, the second common CAPC being different from the first common CAPC, the determining the CAPC for the first DRB being based at least on the first common CAPC in response to the first subset of QoS flows being larger than the second subset of QoS flows.

7. The method of any of aspects 1-6, further comprising:

mapping, by the first user equipment (UE), a second plurality of quality of service flows (QoS flows) to a second data radio bearer (DRB).

8. The method of aspect 7, further comprising:

determining, by the first UE, a separate CAPC for the second DRB for transmitting a second data packet based on the second plurality of QoS flows, wherein the CAPC for the first DRB and the separate CAPC for the second DRB are different; and transmitting, by the first UE to a third UE, the second data packet with the separate CAPC.

9. The method of aspect 7, wherein the selecting the CAPC for the first DRB is based at least on a first zone in which the second UE is located, the method further comprising:

determining, by the first UE, a separate CAPC for the second DRB for transmitting a second data packet based on a second zone in which a third UE is located, wherein the first zone and the second zone are different; and transmitting, by the first UE to the third UE, the second data packet with the separate CAPC for the second DRB based on a second zone in which a third UE is located, wherein the first zone and the second zone are different.

10. The method any of aspects 1-9, wherein the determining the CAPC is based at least on a transmission type, the transmission type being one of broadcast, groupcast, or unicast.

11. The method of any of aspects 1-10, wherein the determining the CAPC is based at least on whether transmitting the first data packet employs hybrid automatic repeat request (HARD).

12. The method of any of aspects 1-11, further comprising:

transmitting, from the first UE to a base station (BS), a second data packet with a separate CAPC different than the CAPC for the first DRB.

13. The method of any of aspects 1-12, further comprising:

updating, by the first UE, the CAPC for the first DRB in response to a QoS flow being added to the first plurality of QoS flows or removed from the first plurality of QoS flows.

14. The method of any of aspects 1-13, wherein the determining comprises:

receiving, by the first UE from a base station (BS), the rule.

15. The method of any of aspects 1-13, wherein the determining comprises:

configuring, by the first UE, the rule.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication comprising:

mapping, by a first user equipment (UE), a first plurality of quality of service flows (QoS flows) to a first data radio bearer (DRB) between the first UE and a second UE;

determining, by the first UE, a channel access priority class (CAPC) for the first DRB for transmitting a first data packet based on a rule applied to the first plurality of QoS flows mapped to the first DRB; and transmitting, by the first UE to the second UE, the first data packet with the determined CAPC.

2. The method of claim 1, wherein the first plurality of QoS flows mapped to the first DRB comprises a corresponding plurality of CAPCs.

3. The method of claim 2, wherein the first plurality of QoS flows are mapped to the first DRB based at least on the corresponding plurality of CAPCs being the same among the first plurality of QoS flows, the determining the CAPC for the first DRB being based at least on the same CAPC.

4. The method of claim 2, wherein a first CAPC from among the plurality of CAPCs comprises a lower access priority than a second CAPC from among the plurality of CAPCs, the determining further comprising:
  determining the first CAPC based at least on the first CAPC comprising the lower access priority.

5. The method of claim 2, wherein a first CAPC from among the plurality of CAPCs comprises a higher access priority than a second CAPC from among the plurality of CAPCs, the determining further comprising:
  determining the first CAPC based at least on the first CAPC comprising the higher access priority.

6. The method of claim 2, wherein the determining further comprises:
  identifying, by the first UE, a first subset of QoS flows from among the first plurality of QoS flows having first common CAPC; and
  identifying, by the first UE, a second subset of QoS flows from among the first plurality of QoS flows having a second common CAPC, the second common CAPC being different from the first common CAPC, the determining the CAPC for the first DRB being based at least on the first common CAPC in response to the first subset of QoS flows being larger than the second subset of QoS flows.

7. The method of claim 2, further comprising:
  mapping, by the first user equipment (UE), a second plurality of quality of service flows (QoS flows) to a second data radio bearer (DRB).

8. The method of claim 7, further comprising:
  determining, by the first UE, a separate CAPC for the second DRB for transmitting a second data packet based on the second plurality of QoS flows, wherein the CAPC for the first DRB and the separate CAPC for the second DRB are different; and
  transmitting, by the first UE to a third UE, the second data packet with the separate CAPC.

9. The method of claim 7, wherein the selecting the CAPC for the first DRB is based at least on a first zone in which the second UE is located, the method further comprising:
  determining, by the first UE, a separate CAPC for the second DRB for transmitting a second data packet based on a second zone in which a third UE is located, wherein the first zone and the second zone are different; and
  transmitting, by the first UE to the third UE, the second data packet with the separate CAPC for the second DRB based on a second zone in which a third UE is located, wherein the first zone and the second zone are different.

10. The method of claim 2, wherein the determining the CAPC is based at least on a transmission type, the transmission type being one of broadcast, groupcast, or unicast.

11. The method of claim 2, wherein the determining the CAPC is based at least on whether transmitting the first data packet employs hybrid automatic repeat request (HARQ).

12. The method of claim 2, further comprising:
  transmitting, from the first UE to a base station (BS), a second data packet with a separate CAPC different than the CAPC for the first DRB.

13. The method of claim 2, further comprising:
  updating, by the first UE, the CAPC for the first DRB in response to a QoS flow being added to the first plurality of QoS flows or removed from the first plurality of QoS flows.

14. The method of claim 1, wherein the determining comprises:
  receiving, by the first UE from a base station (BS), the rule.

15. The method of claim 1, wherein the determining comprises:
  configuring, by the first UE, the rule.

16. A user equipment (UE) comprising:
  a processor configured to:
    map a first plurality of quality of service flows (QoS flows) to a first data radio bearer (DRB) between the UE and a second UE;
    determine a channel access priority class (CAPC) for the first DRB for transmitting a first data packet based on a rule applied to the first plurality of QoS flows mapped to the first DRB; and
  a transceiver configured to:
    transmit to the second UE the first data packet with the determined CAPC.

17. The UE of claim 16, wherein the first plurality of QoS flows mapped to the first DRB comprises a corresponding plurality of CAPCs.

18. The UE of claim 17, wherein the first plurality of QoS flows are mapped to the first DRB based at least on the corresponding plurality of CAPCs being the same among the first plurality of QoS flows, the determining the CAPC for the first DRB being based at least on the same CAPC.

19. The UE of claim 17, wherein a first CAPC from among the plurality of CAPCs comprises a lower access priority than a second CAPC from among the plurality of CAPCs, wherein the processor configured to determine the CAPC for the first DRB is further configured to:
  determine the first CAPC based at least on the first CAPC comprising the lower access priority.

20. The UE of claim 17, wherein a first CAPC from among the plurality of CAPCs comprises a higher access priority than a second CAPC from among the plurality of CAPCs, wherein the processor configured to determine the CAPC for the first DRB is further configured to:
  determine the first CAPC based at least on the first CAPC comprising the higher access priority.

21. The UE of claim 17, wherein the processor configured to determine the CAPC for the first DRB is further configured to:
  identify a first subset of QoS flows from among the first plurality of QoS flows having first common CAPC; and
  identify a second subset of QoS flows from among the first plurality of QoS flows having a second common CAPC, the second common CAPC being different from the first common CAPC, the determining the CAPC for the first DRB being based at least on the first common CAPC in response to the first subset of QoS flows being larger than the second subset of QoS flows.

22. The UE of claim 17, wherein the processor is further configured to:
  map a second plurality of quality of service flows (QoS flows) to a second data radio bearer (DRB).

23. The UE of claim 22, wherein the processor is further configured to:
  determine a separate CAPC for the second DRB for transmitting a second data packet based on the second plurality of QoS flows, wherein the CAPC for the first DRB and the separate CAPC for the second DRB are different; and
  transmit, to a third UE, the second data packet with the separate CAPC.

24. The UE of claim 22, wherein the processor configured to determine the CAPC for the first DRB is further configured to determine the CAPC for the first DRB based at least on a first zone in which the second UE is located, and the processor is further configured to:

determine a separate CAPC for the second DRB for transmitting a second data packet based on a second zone in which a third UE is located, wherein the first zone and the second zone are different; and transmit, to the third UE, the second data packet with the separate CAPC for the second DRB based on a second zone in which a third UE is located, wherein the first zone and the second zone are different.

25. The UE of claim 17, wherein the processor configured to determine the CAPC for the first DRB is further configured to determine the CAPC based at least on a transmission type, the transmission type being one of broadcast, groupcast, or unicast.

26. The UE of claim 17, wherein the processor configured to determine the CAPC for the first DRB is further configured to determine the CAPC based at least on whether transmitting the first data packet employs hybrid automatic repeat request (HARQ).

27. The UE of claim 17, wherein the transceiver is further configured to:

transmit, to a base station (BS), a second data packet with a separate CAPC different than the CAPC for the first DRB.

28. The UE of claim 17, wherein the processor is further configured to:

update the CAPC for the first DRB in response to a QoS flow being added to the first plurality of QoS flows or removed from the first plurality of QoS flows.

29. The UE of claim 16, wherein the processor configured to determine the CAPC for the first DRB is further configured to:

receive, from a base station (BS), the rule.

30. The UE of claim 16, wherein the processor configured to determine the CAPC for the first DRB is further configured to configure the rule.

* * * * *